(12) United States Patent
Itou

(10) Patent No.: US 6,560,021 B2
(45) Date of Patent: May 6, 2003

(54) VARIABLE OPTICAL WAVELENGTH FILTER

(75) Inventor: Tohru Itou, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 93 days.

(21) Appl. No.: 09/928,408

(22) Filed: Aug. 14, 2001

(65) Prior Publication Data

US 2002/0024736 A1 Feb. 28, 2002

(30) Foreign Application Priority Data

Aug. 31, 2000 (JP) .................................. 2000-263905

(51) Int. Cl.[7] .................................................. G02B 6/28
(52) U.S. Cl. ..................... 359/579; 359/589; 359/179; 359/188; 359/195; 372/38; 385/24; 385/37
(58) Field of Search ................ 385/37, 24; 372/20, 372/38; 359/578, 579, 589, 179, 187, 188, 195, 193

(56) References Cited

U.S. PATENT DOCUMENTS 5,781,332 A  *  7/1998  Ogata ........................... 359/308
6,043,922 A  *  3/2000  Koga et al. .................. 359/193

* cited by examiner

*Primary Examiner*—Audrey Chang
*Assistant Examiner*—Fayez Assaf
(74) *Attorney, Agent, or Firm*—Wenderoth, Lind & Ponack, L.L.P.

(57) ABSTRACT

A variable optical wavelength filter for making it possible to control the movement of an optical wavelength filter during a momentary loss of the optical input signal in the same way as when the optical input signal is present. Even when the input of the second direct current signal to an integrator is interrupted because of the momentary loss of the optical input signal, the integrator is able to place a dielectric multilayer filter at the position directly before the momentary loss of the optical input signal because of sustaining the voltage from directly before the momentary loss of the optical input signal.

15 Claims, 10 Drawing Sheets

TRANSMITTANCE CURVE

VARIABLE OPTICAL WAVELENGTH FILTER

BACKGROUND OF THE INVENTION

1. Field of the Invention

The present invention relates to a variable optical wavelength filter for selecting the wavelength of an optical output signal from the wavelength of an optical input signal and outputting the optical output signal.

2. Description of Related Art

Conventionally, dielectric multilayer filters are used in variable optical wavelength filters in the field of optical interconnections. The wavelength of the optical input signal input to this dielectric multilayer filter may vary because of temperature variations in the oscillator generating this optical input signal. It is normally necessary to substantially maximize the transmittance of the dielectric multilayer filter with respect to the optical output signal corresponding to this wavelength variation. For this reason, before now, the filter was controlled and caused to follow this wavelength variation, so that the dielectric multilayer filter comes to a position at which the maximum transmittance is substantially provided, with the axis of rotation being the center line of the dielectric multilayer filter, orthogonal to the crossover line of the incident plane at which the optical input signal is incident to the dielectric multilayer filter and the dielectric multilayer filter.

However, there are two problems with a variable optical wavelength filter having a conventional constitution. The first problem is that it becomes impossible to control the rotation of the dielectric multilayer filter in the event of a momentary interruption of the optical input signal (caused by a lightning strike, for example). The second problem is that it becomes impossible to control the rotation of the dielectric multilayer filter when the frequency of wavelength variation of the optical input signal discussed above becomes a specific frequency (detection frequency). The desired optical output signal cannot be branched or outputted from the dielectric multiplayer filter when it becomes impossible to control the rotation of the dielectric multilayer filter.

In order to resolve the first problem, it is desirable to develop a variable optical wavelength filter that can retain the position of the optical wavelength filter even in the event of a momentary interruption of the optical input signal.

In order to resolve the second problem, it is desirable to develop a variable optical wavelength filter with which the movement of the optical wavelength filter can be controlled regardless of a variations in intensity of the optical input signal.

SUMMARY OF THE INVENTION

In order to resolve the first problem, the variable optical wavelength filter according to a first aspect of the present invention is provided an optical wavelength filtering portion and optical wavelength filter control system, for a constitution for selecting the wavelength of the optical output signal from the wavelengths of the optical input signal and outputting or branching this optical output signal.

This optical wavelength filtering portion comprises an optical wavelength filter for selecting the specific wavelength for providing the maximum transmission peak to the optical output signal from the wavelengths of the optical input signal.

This optical wavelength filter control system outputs to the optical wavelength filtering portion a control signal comprising: a direct current movement signal for moving the wavelength filter to the position for selecting the specific wavelength of the optical output signal according to the wavelength variation of the optical input signal; and an alternating current detection signal for providing the amplitude frequency to the optical output signal by causing the optical wavelength filter to vibrate slightly at a fixed detection frequency.

Furthermore, this optical wavelength filter control system comprises an optical wavelength filter control portion including a direct current component forming portion for sustaining the output of the abovementioned direct current movement signal even in the event of a momentary loss of the optical input signal, and determining the size of the direct current movement signal based on the amplitude of the optical output signal; and an alternating current detection signal generator for outputting the abovementioned alternating current detection signal of the detection frequency.

With the abovementioned variable optical wavelength filter according to the present invention, this optical wavelength filter control portion can output the direct current movement signal for filtering the optical output signal to the optical wavelength filtering portion even in the event of a momentary loss of the optical input signal. Consequently, this optical wavelength filter control portion can maintain the position of the abovementioned optical wavelength filter when there is an optical input signal, of course, and in the same way when the optical input signal is lost.

For realizing the optical variable wavelength filter according to a first aspect of the present invention, the optical wavelength filter control system may preferably comprise a beam splitting portion for splitting the optical output signal into an optical monitoring signal and an optical main signal; and a photoelectric converting portion for converting this optical monitoring signal to an electric feedback monitoring signal and outputting this signal to the abovementioned optical wavelength filter control portion.

With the constitution as described above, the electric feedback monitoring signal having amplitude frequency can be output to the optical wavelength filter control portion.

For realizing the variable optical wavelength filter according to a first aspect of the present invention, the optical wavelength filter control system preferably comprises first and second beam splitting portions, first and second photoelectric converting portions, and a divider or dividing portion, in order to resolve the second problem discussed above.

The first beam splitting portion splits the optical input signal into a first optical monitoring signal and an optical input signal. Also, the second beam splitting portion splits the optical output signal into a second optical monitoring signal and an optical main signal. These first and second photoelectric converting portions convert the first and second optical monitoring signals to first and second electric monitoring signals respectively. Also, this divider divides the second electric monitoring signal by the first electric monitoring signal and outputs the result as the electric feedback monitoring signal to the abovementioned optical wavelength filter control portion.

With the constitution as discussed above, the amplitude of the optical output signal becomes the product of the amplitude of the optical input signal and the transmittance of the abovementioned wavelength filter which vibrates slightly at the detection frequency, in the case where the optical input signal is a single wavelength beam. The components of these optical input and output signals are equivalent respectively to the components of the first and second electric monitoring signals. Consequently, the amplitude of the second electric monitoring signal becomes the product of the amplitude of the first electric monitoring signal and the transmittance of the wavelength filter which vibrates slightly at the detection frequency. Accordingly, by dividing the second electric monitoring signal by the first electric monitoring signal, the divider or dividing portion discussed above can output to the abovementioned optical wavelength filter control portion an electric feedback monitoring signal that is a signal with the component of the first electric monitoring signal removed from the second electric monitoring signal. As discussed above, the component of the first electric monitoring signal is equivalent to the component of the optical input signal. As a result, the component of the optical input signal is not included in the electric feedback monitoring signal output to the optical wavelength filter control portion. Accordingly, even if the intensity of the optical input signal varies, the electric feedback monitoring signal does not include the component resulting from the variations in intensity of the optical input signal. The abovementioned optical wavelength filter control portion extracts the alternating current component from this electric feedback monitoring signal and controls the optical position of the wavelength filter on the basis of that alternating current component. The alternating current component does not include the variable component resulting from the variations in intensity of the optical input signal. Accordingly, this optical wavelength filter control portion can control the optical wavelength filter regardless of the variations in intensity of the optical input signal because of being able to output to the optical wavelength filtering portion a control signal for providing the maximum transmission peak to the optical output signal.

For realizing the variable optical wavelength filter according to a first aspect of the present invention, the direct current component forming portion preferably comprises a lock-in amplifier, an amplitude amplifier, and an integrator (an inverting amplifier, for example).

This lock-in amplifier extracts the amplitude frequency component from the abovementioned electric feedback monitoring signal and smoothes and converts this amplitude frequency component to a first direct current signal. Next, this amplitude amplifier amplifies the amplitude of this first direct current signal and converts this signal to a second direct current signal. Next, this integrator integrates this second direct current signal and outputs the result as the direct current movement signal to the optical wavelength filtering portion.

With the constitution as discussed above, this integrator accumulates and sums these second direct current signals. In other words, this integrator functions as a memory holder for the direct current movement signal that is the cumulative sum of these second direct current signals. Accordingly, even if the second direct current signal input to the integrator is momentarily lost due to a momentary loss of the optical input signal, this integrator continues to output the direct current movement signal, for branching or outputting or filtering optical output signal, to the abovementioned optical wavelength filtering portion during that momentary loss. Consequently, the position of the optical wavelength filter can be retained when the optical input signal is present, of course, and in the same way during a momentary loss of the optical input signal.

Explained next is the variable optical wavelength filter according to a second aspect of the present invention for resolving the second problem and having a separate constitution from the variable optical wavelength filter according to the first aspect.

The variable optical wavelength filter according to a second aspect of the present invention is provided an optical wavelength filtering portion and optical wavelength filter control system, for a constitution for selecting the wavelength of the optical output signal from the wavelengths of the optical input signal and outputting or filtering or branching this optical output signal.

This optical wavelength filtering portion comprises an optical wavelength filter for selecting the wavelength of the optical output signal including a specific wavelength.

In the case where the wavelength of the optical output signal matches a predetermined reference wavelength, this optical wavelength filter selects the wavelength for providing the maximum transmission peak to the optical output signal from the wavelengths of the optical input signal as the specific wavelength. In the case where the wavelength of the optical output signal differs from the reference wavelength, this optical wavelength filter selects the wavelength for providing a transmittance slightly less than the maximum transmission peak, and corresponding to this difference, from the wavelengths of the optical input signal to the optical output signal as the specific wavelength.

Furthermore, the abovementioned optical wavelength filter control system outputs to the optical wavelength filtering portion a control signal comprising a direct current movement signal for moving the optical wavelength filter to the position for selecting the specific wavelength corresponding to the wavelength variations of the optical input signal, and an alternating current detection signal for providing the amplitude frequency to the optical output signal by causing slight vibration of the optical wavelength filter at a fixed detection frequency.

This optical wavelength filter control system comprises a wavelength filter control portion, first and second beam splitting portions, first and second photoelectric converting portions, and a dividing portion or divider.

This optical wavelength filter control portion includes a direct current component forming portion for determining the size of the direct current movement signal based on the amplitude of the optical output signal, and an alternating current detection signal generator for outputting the alternating current detection signal of the detection frequency. The first beam splitting portion splits the optical input signal into a first optical monitoring signal and an optical input signal. The second beam splitting portion splits the optical output signal into a second optical monitoring signal and an optical main signal. The first and second photoelectric converting portions convert the first and second optical monitoring signals to first and second electric monitoring signals respectively. The divider divides the second electric monitoring signal by the first electric monitoring signal and outputs the result as the electric feedback monitoring signal to the abovementioned optical wavelength filter control portion.

With the constitution as discussed above, the amplitude of the optical output signal becomes the product of the amplitude of the optical input signal and the transmittance of the abovementioned optical wavelength filter which vibrates slightly at the detection frequency, in the case where the optical input signal is a single wavelength beam. The components of these optical input and output signals are equivalent respectively to the components of the first and second electric monitoring signals. Consequently, the amplitude of the second electric monitoring signal becomes the product of the amplitude of the first electric monitoring signal and the transmittance of the wavelength filter which vibrates slightly at the detection frequency. Accordingly, by dividing the second electric monitoring signal by the first electric monitoring signal, the dividing portion or divider discussed above can output to the abovementioned optical wavelength filter control portion an electric feedback monitoring signal that is a signal with the component of the first electric monitoring signal removed from the second electric monitoring signal. As discussed above, the component of the first electric monitoring signal is equivalent to the component of the optical input signal. As a result, the component of the optical input signal is not included in the electric feedback monitoring signal output to the optical wavelength filter control portion. Accordingly, even if the intensity of the optical input signal varies, the electric feedback monitoring signal does not include the component resulting from the variations in intensity of the optical input signal. The abovementioned optical wavelength filter control portion extracts the alternating current component from this electric feedback monitoring signal and controls the position of the optical wavelength filter on the basis of that alternating current component. The alternating current component does not include the variable component resulting from the variations in intensity of the optical input signal. Accordingly, this optical wavelength filter control portion can control the optical wavelength filter regardless of the variations in intensity of the optical input signal because of being able to output to the optical wavelength filtering portion a control signal for providing the maximum transmission peak to the optical output signal.

Also, for realizing the variable optical wavelength filter according to a second aspect of the present invention, the direct current component forming portion preferably comprises a reference bias component generator, a lock-in amplifier, an amplitude amplifier, and an adder.

This reference bias component generator outputs a reference bias signal for moving the optical wavelength filter to the standard position for selecting the reference wavelength. This lock-in amplifier extracts the amplitude frequency component from the abovementioned electric feedback monitoring signal and smoothes and converts this amplitude frequency component to a first direct current signal. Also, this amplitude amplifier amplifies the amplitude of this first direct current signal and converts this signal to a second direct current signal for moving this optical wavelength filter from the abovementioned standard position to a position for selecting the specific wavelength. Also, this adder adds the second direct current signal and the reference bias signal and outputs the result as the abovementioned direct current movement signal to the optical wavelength filtering portion.

With the constitution as discussed above, the direct current component forming portion can output the direct current movement signal for filtering the optical output signal to the optical wavelength filtering portion.

Also, for realizing the variable optical wavelength filter according to the first or second aspect of the present invention, the optical wavelength filter may preferably be a dielectric multilayer filter.

If a dielectric multilayer filter is used as the optical wavelength filter, the wavelength vs. transmittance curve (hereinafter "transmittance curve") of this dielectric multilayer filter has a sharp peak; as a result, the filter substantially provides the maximum transmission peak. Consequently, it is possible to improve the transmittance of the optical output signal.

Also, for realizing the variable optical wavelength filter according to the first or second aspect of the present invention, the optical wavelength filtering portion may preferably comprise an actuator for converting the control signal to power and having a shaft for moving this optical wavelength filter based on this power. For example, this actuator may cause the optical wavelength filter to rotate and vary the specific wavelength discussed above; the axis of rotation is the center line of the optical wavelength filter, orthogonal to the crossover line of the incident plane at which the optical input signal is incident to the optical wavelength filter and the filter surface of the optical wavelength filter. Also, for example, this actuator may move this optical wavelength filter within a plane perpendicular to the direction at which the optical input signal is incident to the optical wavelength filter and change the abovementioned specific wavelength.

BRIEF DESCRIPTION OF THE DRAWINGS

The foregoing and other objects, features and advantages of the present invention will be better understood from the following description taken in connection with accompanying drawings, in which.

DESCRIPTION OF THE PREFERRED EMBODIMENTS

The preferred embodiments of the variable optical wavelength filter according to the present invention will be explained below with reference to the drawings. Moreover, the drawings are merely for the purpose of providing a general illustration in order that the present invention be understood and consequently the present invention is not limited by these illustrations.

The variable optical wavelength filter according to the present invention comprises an optical wavelength filtering portion with a conventional constitution. Consequently, in order to make the present invention easy to understand, the optical wavelength filtering portion of the variable optical wavelength filter will be explained with reference to FIG. 7 in advance of the explanation of the preferred embodiments of the present invention.

The optical wavelength filtering portion comprises an optical wavelength filter 101 and an actuator 105 having a shaft 103 for converting the control signal input from the optical wavelength filter control portion (discussed below) to power and moving the optical wavelength filter 101 based on this power.

Figure 7:
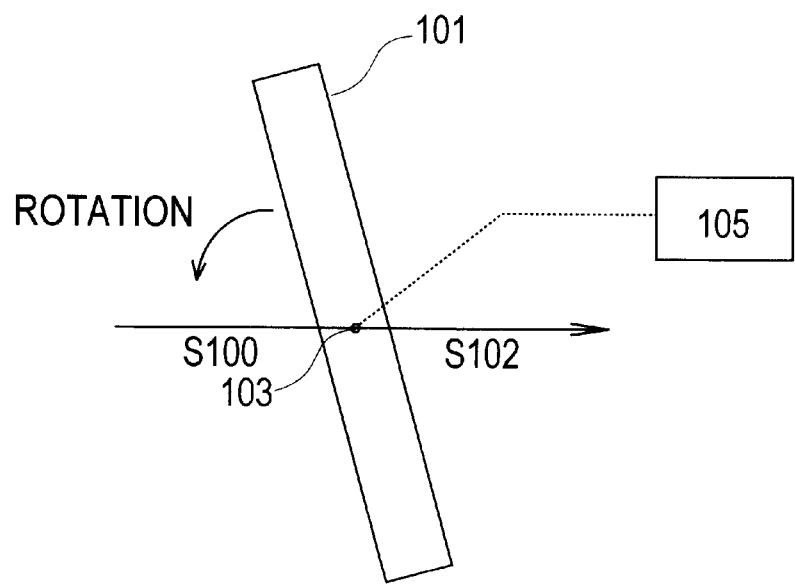
FIG. 7 is a drawing for explaining the rotation of the optical wavelength filter.

In the preferred embodiments of the present invention, an actuator 105 causes the rotation of the optical wavelength filter 101 with the center line of this optical wavelength filter 101 as the axis of rotation 103. This center line is orthogonal to the crossover line of the incident plane, i.e. the surface at which the optical input signal S100 is incident to the optical wavelength filter 101 and the filter surface of the optical wavelength filter 101. FIG. 7 is a drawing for explaining the rotation of the optical wavelength filter 101. In FIG. 7, the axis of rotation 103 extends in a direction perpendicular to the surface of the paper and the connection between this axis of rotation 103 and the actuator 105 is shown with a dotted line. Moreover, the constitution of the interior of this actuator 105 is known and therefore an explanation thereof is omitted.

Figure 8:
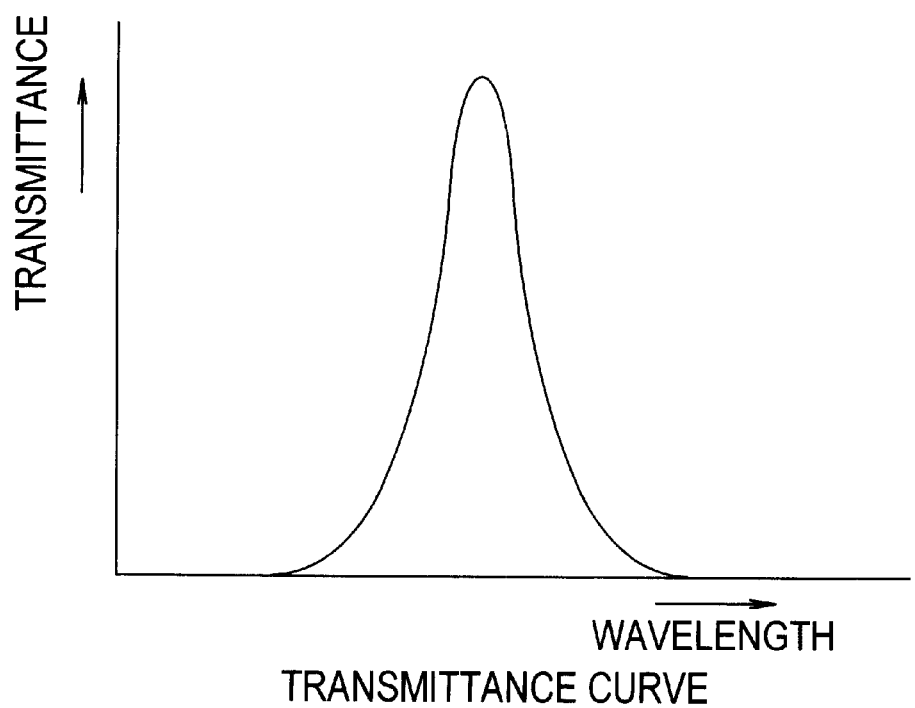
FIG. 8 shows the transmittance curve of the dielectric multilayer filter.

In the embodiments of the present invention, a dielectric multilayer filter 101 is used as an optical wavelength filter 101. FIG. 8 shows the transmittance curve of the dielectric multilayer filter 101 when the direction at which the optical input signal S100 is input to the dielectric multilayer filter 101 is fixed in a certain direction. The vertical and horizontal axes in FIG. 8 show the transmittance curve and wavelength of the optical input signal S100, respectively. If the dielectric multilayer filter 101 is used as the optical wavelength filter 101, the transmittance curve of this dielectric multilayer filter 101 has a sharp peak and therefore substantially provides the maximum transmission peak. Consequently, it is possible to improve the transmittance of the optical output signal S102.

Figure 9:
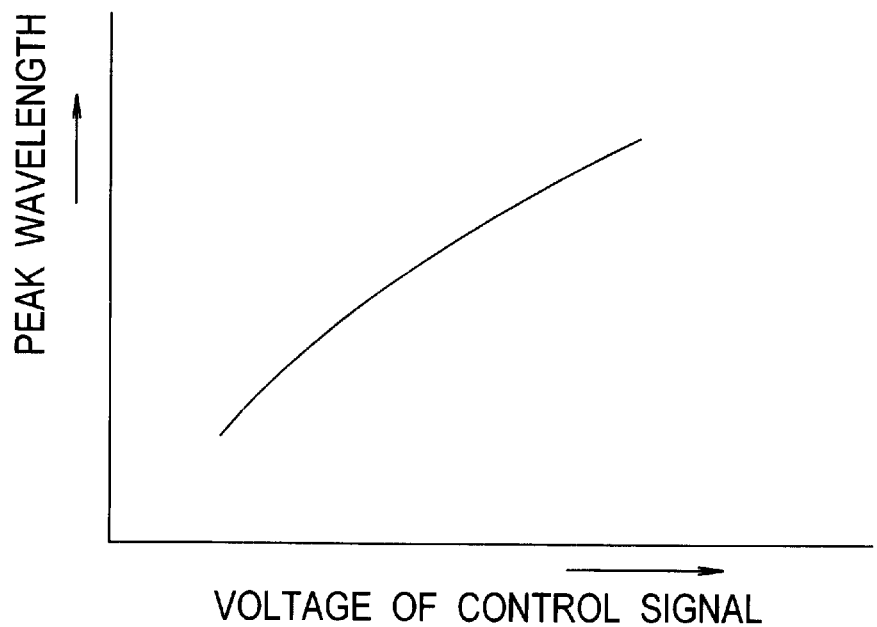
FIG. 9 is a drawing for explaining the relationship between the control signal and peak wavelength.

This transmittance curve moves parallel to the wavelength direction corresponding to the direction at which the optical input signal S100 is incident to the dielectric multilayer filter 101. Namely, the peak wavelength of the transmittance curve shifts according to the incident angle of the input signal S100. Accordingly, the dielectric multilayer filter 101 may be rotated to select or branch the optical output signal S102 with respect to its wavelength from the optical input signal S100 through the dielectric multilayer filter 101, so that the transmittance curve of the optical output signal S102 becomes the maximum (or the substantial maximum). Moreover, this dielectric multilayer filter 101 rotates according to the voltage of the direct current movement signal (discussed below) in the control signal output from the optical wavelength filter control portion (discussed below) to the optical wavelength filtering portion. FIG. 9 is a graph showing the relationship between the voltage of the control signal and the peak wavelength (the wavelength is defined below). The vertical and horizontal axes respectively show the transmission wavelength peak and the voltage of the control signal. In the present embodiment, the transmission wavelength peak increases smoothly when the voltage of the control signal increases.

However, as discussed above, the wavelength of this optical input signal S100 also varies with temperature changes in the generator of this optical input signal S100. In response to these variations in wavelength, it is necessary to maintain the transmittance of the optical output signal S102 at the maximum (or substantial maximum). For this reason, it is necessary to recognize the divergence between the wavelength of the optical output signal S102 and wavelength of the abovementioned transmission wavelength peak by using part of the optical output signal S102 for feedback and to output the control signal to the optical wavelength filtering portion from the optical wavelength filter control portion in order to eliminate (or substantially eliminate) this divergence.

This dielectric multilayer filter 101 continues to rotate and vibrate slightly on the basis of the alternating current detection signal (the alternating current detection signal is discussed below) in the control signal output from the optical wavelength filter control portion to the optical wavelength filtering portion. The frequency of this alternating current detection signal and the frequency of the slight rotation and vibration of the dielectric multilayer filter 101 are equal to each other. This frequency is called the detection frequency. Accordingly, the transmittance curve discussed above vibrates slightly and continuously with respect to the wavelength direction at the detection frequency. At this time, the wavelength corresponding to the abovementioned transmission wavelength peak, which is the maximum value of the transmittance curve at the center of the slight vibration of this transmittance curve, is defined as the peak wavelength.

The alternating current component is provided to the optical output signal S102 by the continuous slight vibration of the dielectric multilayer filter 101 at the detection frequency. The frequency of the alternating current component of this optical output signal S102 is called the amplitude frequency. The amplitude of the direct current movement signal in the control signal that is fed back to the optical wavelength filtering portion from the optical wavelength filter control portion is determined on the basis of this amplitude frequency. As discussed above, the dielectric multilayer filter 101 rotates on the basis of the amplitude of this direct current movement signal.

The relationship between the waveform and phase of the alternating current detection signal in the control signal and the optical output signal S102 will be explained with reference to FIGS. 10 through 12, as well as FIG. 7.

Figure 10:
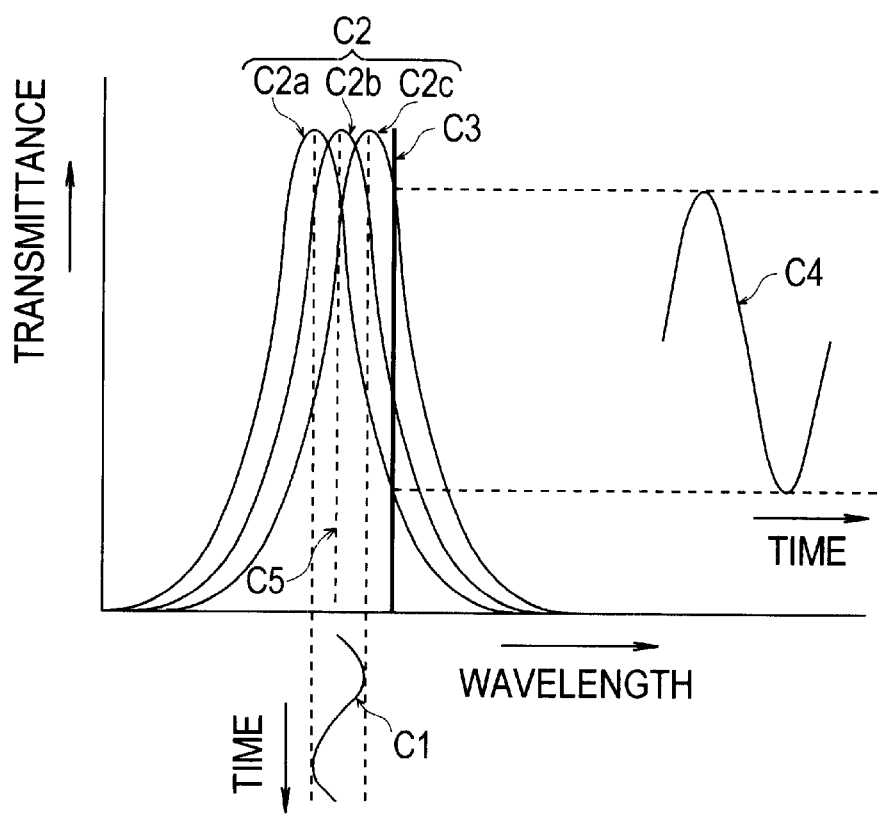
FIG. 10 is a drawing for explaining the relationships of each waveform in the case where the peak wavelength shifts to the short wavelength side with respect to the wavelength of the optical output signal.
Figure 11:
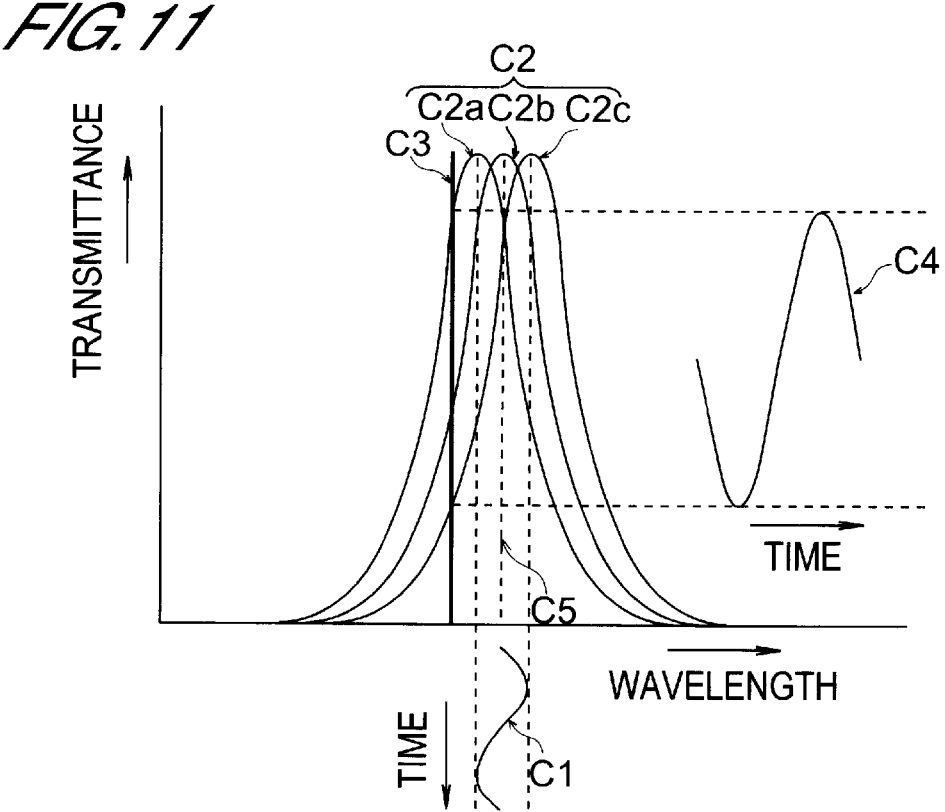
FIG. 11 is a drawing for explaining the relationships of each waveform in the case where the peak wavelength shifts to the long wavelength side with respect to the wavelength of the optical output signal.
Figure 12:
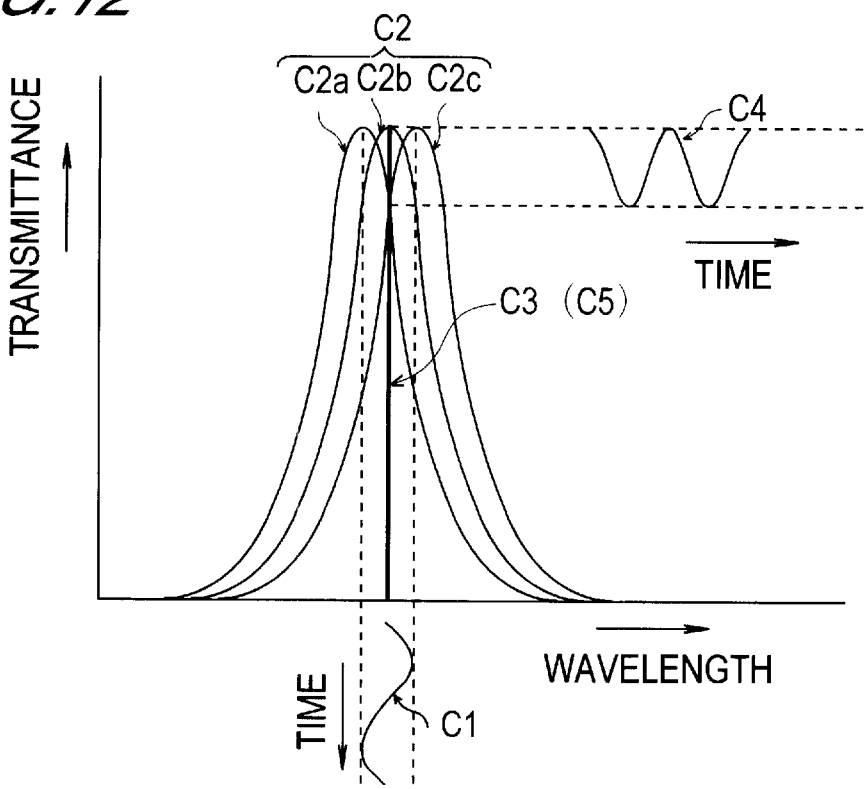
FIG. 12 is a drawing for explaining the relationships of each waveform in the case where the peak wavelength matches the wavelength of the optical output signal.

FIGS. 10 through 12 respectively show the case where the peak wavelength of the dielectric multilayer filter 101 is displaced to the short wavelength side with respect to the wavelength of the optical output signal S102; the case where the peak wavelength of the dielectric multilayer filter 101 is displaced to the long wavelength side with respect to the optical output signal S102; and the case where the peak wavelength of the filter matches the wavelength of the optical output signal S102.

The sine curve C1 below each of these FIGS. 10 through 12 is a curve of the variations in the alternating current detection signal in the control signal with respect to time. The vertical and horizontal axes of the curve C1 show voltage and time respectively. The frequency of this control signal is the detection frequency as discussed above.

Also, the curve C2 (C2a through C2c) resembling a Gaussian curve in the center of each of these FIGS. 10 through 12 is the transmittance curve of the dielectric multilayer filter 101 with respect to the wavelength of the optical output signal S102. The vertical and horizontal axes of these curves C2 show transmittance and wavelength respectively. As discussed above, the curves C2 vary by the detection frequency over each curve C2a (left end) to C2b (center) to C2c (right end) in response to the variation of the alternating current detection signal in the control signal.

The line segment C3 cutting the curve C2 in these FIGS. 10 through 12 is a marking segment showing the position of the wavelength of the optical output signal S102 transmitted through the dielectric multilayer filter 101.

The curve C4 resembling a sine curve to the right of each of these FIGS. 10 through 12 is the curve of beam intensity with respect to time of the optical output signal S102. The vertical and horizontal axes of these curves C4 show beam intensity and time respectively. These curves C4 show the variation of the intersection point between the curve C2 and the line segment C3. The frequency of the alternating current component of the optical output signal S102 is the amplitude frequency as discussed above.

The curve C5 (dotted line) in each of these FIGS. 10 through 12 is a marking segment for the wavelength peak of the dielectric multilayer filter 101.

As shown in FIG. 10, in the case where the peak wavelength C5 shifts to the short wavelength side with respect to the wavelength C3 of the optical output signal S102, the optical output signal S102 (C4) is in the same phase as the alternating current detection signal C1 in the control signal and the amplitude frequency of the alternating current component of the optical output signal S102 (C4) becomes the detection frequency, the same as the frequency of the alternating current detection signal C1 in the control signal.

As shown in FIG. 11, in the case where the peak wavelength C5 shifts to the long wavelength side with respect to the wavelength C3 of the optical output signal S102, the optical output signal S102 (C4) is in the phase opposite to the alternating current detection signal C1 in the control signal and the amplitude frequency of the alternating current component of the optical output signal S102 (C4) becomes the detection frequency, the same as the frequency of the alternating current detection signal C1 in the control signal.

As shown in FIG. 12, in the case where the peak wavelength C5 matches the wavelength C3 of the optical output signal S102, the amplitude frequency of the alternating current component of the optical output signal S102 (C4) becomes twice the detection frequency.

The above can be summed up as follows.

Specifically, in the case where the peak wavelength C5 shifts to the long or short wavelength side with respect to the wavelength C3 of the optical output signal S102, the amplitude frequency of the alternating current component of the optical output signal S102 (C4) becomes the detection frequency. Also, in the case where the peak wavelength C5 matches the wavelength C3 of the optical output signal S102, the amplitude frequency of the alternating current component of the optical output signal S102 (C4) becomes twice the detection frequency.

Furthermore, in the case where the peak wavelength C5 shifts to the short wavelength side with respect to the wavelength C3 of the optical output signal S102, the optical output signal S102 (C4) is in the same phase as the alternating current detection signal C1 in the control signal. In the case where the peak wavelength C5 shifts to the long wavelength side with respect to the wavelength C3 of the optical output signal S102, the optical output signal S102 (C4) is in the phase opposite to the alternating current detection signal C1 in the control signal.

The control signal for matching (or substantially matching) the peak wavelength C5 to the wavelength of the optical output signal S102 (C4) is formed on the basis of the amplitude frequency, phase, and amplitude of the alternating current components of these optical output signals S102 (C4).

The embodiments of the variable optical wavelength filter that is provided the abovementioned optical wavelength filtering portion will be explained hereinbelow.

First Embodiment

The function of the variable optical wavelength filter according to the present invention will be explained with reference to FIGS. 1 and 2.

Figure 1:
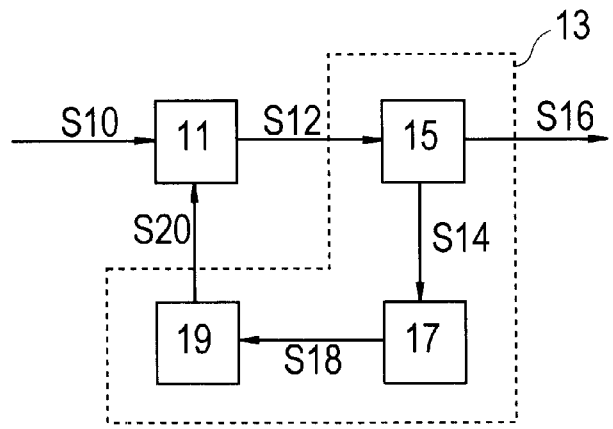
FIG. 1 is a block diagram for explaining the constitution of the variable optical wavelength filter according to the first embodiment of the present invention.
Figure 2:
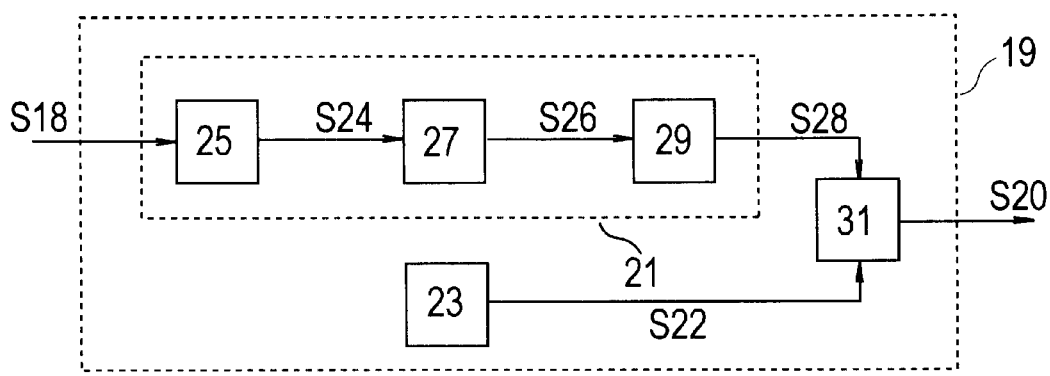
FIG. 2 is a block diagram for explaining the constitution of the optical wavelength filter control portion according to the first embodiment of the present invention.

FIGS. 1 and 2 are block diagrams for explaining the function of the variable optical wavelength filter according to the first embodiment. This variable optical wavelength filter is hereinafter referred to as the first variable optical wavelength filter.

This first variable optical wavelength filter comprises a dielectric multilayer filter for selecting the wavelength of the optical output signal S12 from the wavelength of the optical input signal S10 and outputting or filtering or branching the optical output signal S12. Furthermore, even if the wavelength of the optical input signal S10 varies as discussed above, this first variable optical wavelength filter is able to sustain the maximum transmittance of the optical output signal S12 by causing the rotation of the dielectric multilayer filter 101, corresponding to the variations in wavelength, so as to provide the maximum transmission peak of the dielectric multilayer filter 101 to the optical output signal S12.

This first variable optical wavelength filter comprises an optical wavelength filtering portion 11 having a dielectric multilayer filter 101 for selecting the specific wavelength from the wavelength of the optical input signal S30 to provide the maximum transmission peak to the optical output signal S12, and an optical wavelength filter control system 13. In this first embodiment, this specific wavelength means the peak wavelength discussed above.

This optical wavelength filter control system 13 comprises an optical wavelength filter control portion 19 having a direct current component forming portion 21, an alternating current detection signal generator 23, and an adder 31; a beam splitting portion 15; and a photoelectric converting portion 17.

The flow of the signals in this first variable branching filter will be explained below with reference to FIGS. 1 and 2.

So that the peak wavelength of the dielectric multilayer filter 101 is generally matched to the wavelength of the optical output signal S12 in advance, the direct current component forming portion 21 in the optical wavelength filter control portion 19 outputs the direct current movement signal S28. At the same time, the alternating current detection signal generator 23 is caused to generate the alternating current detection signal S22 with the detection frequency. This detection frequency is continuously constant. The adder 31 adds the direct current movement signal S28 and the alternating current detection signal S22 and outputs the result as the control signal S20 to the optical wavelength filtering portion 11.

Next, the actuator 105 of the optical wavelength filtering portion 11 converts the control signal S20 input from the abovementioned optical wavelength filter control portion 19 to power for causing the rotation of the dielectric multilayer filter 101. In this case, the dielectric multilayer filter 101 rotates on the basis of the direct current movement signal S28 in the control signal S20, so that the wavelength for generally providing the transmission wavelength peak to the optical output signal S12 is selected from the wavelength of the optical input signal S10. At the same time, the dielectric wavelength filter 101 rotates slightly on the basis of the alternating current detection signal S22 in the control signal S20. As discussed above, the frequency of the alternating current detection signal S22 is the detection frequency and corresponding to this, the frequency of the slight rotation of the dielectric multilayer filter 101 also becomes the detection frequency.

Rhythm is provided to the amplitude of the optical output signal S12 by the slight rotation of this dielectric multilayer filter 101. The frequency of the amplitude of this rhythm is the amplitude frequency as discussed above. Specifically, the frequency of the alternating current component of the optical output signal S12 is the amplitude frequency.

The relationship between the amplitude frequency and phase of this optical output signal S12 and the alternating current detection signal S22 in the control signal S20 is as discussed above.

Specifically, in the case where the peak wavelength shifts to the long or short wavelength side with respect to the wavelength of the optical output signal S12 (see FIGS. 10 and 11), the amplitude frequency of the alternating current component of the optical output signal S12 (corresponds to C4) becomes the detection frequency. Also, in the case where the peak wavelength matches the wavelength of the optical output signal S12 (see FIG. 12), the amplitude frequency of the alternating current component of the optical output signal S12 becomes twice the detection frequency.

Furthermore, in the case where the peak wavelength shifts toward the short wavelength side with respect to the wavelength of the optical output signal S12 (see FIG. 10), the optical output signal S12 is in the same phase as the alternating current detection signal S22 (corresponds to C1) in the control signal S20. In the case where the peak wavelength shifts toward the long wavelength side with respect to the wavelength of the optical output signal S12 (see FIG. 11), the optical output signal S12 is in the phase opposite to the alternating current detection signal S22 in the control signal S20.

The optical output signal S12 having this amplitude frequency is output to the beam splitting portion 15 of the abovementioned optical wavelength filter control system 13.

This beam splitting portion 15 splits the optical output signal S12 input from the optical wavelength filtering portion 11 into a monitoring optical signal S14 and an optical main signal S16. This optical main signal S16 is converted to sound or an image after being output from the first variable optical wavelength filter.

Next, the photoelectric converting portion 17 converts the optical monitoring signal S14 input from the beam splitting portion 15 to an electric feedback monitoring signal S18 and outputs this electric feedback monitoring signal S18 to the abovementioned optical wavelength filter control portion 19.

In this first embodiment, the optical wavelength filter control portion 19 comprises a direct current component forming portion 21 having a lock-in amplifier 25, an amplitude amplifier 27, and an integrator 29; an alternating current detection signal generator 23; and an adder 31.

FIG. 2 is a drawing showing the constitution of the optical wavelength filter control portion 19.

The electric feedback monitoring signal S18 output from the abovementioned photoelectric converting portion 17 is input to the lock-in amplifier 25. On the basis of the amplitude frequency, phase, and amplitude of the alternating current component of the optical output signal S12, this lock-in amplifier 25 converts the alternating current component of the optical output signal S12 to a first direct current signal S24 that forms the pattern for the direct current movement signal S28 for controlling the rotation of the dielectric multilayer filter 101.

Figure 13A:
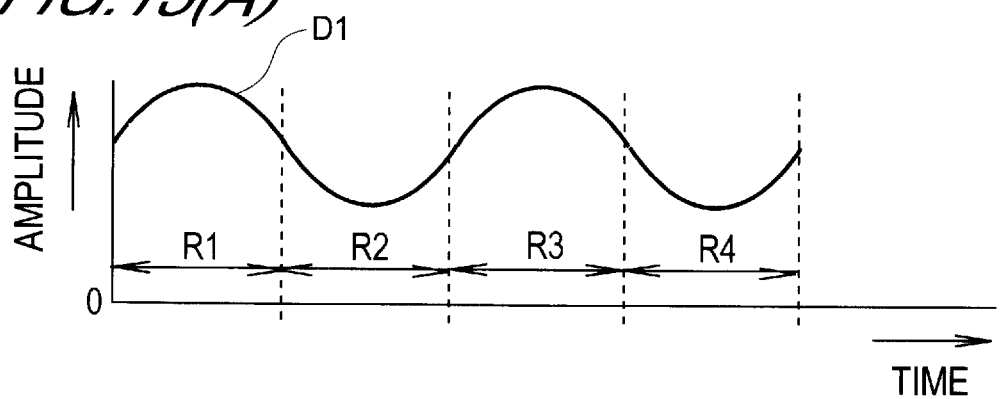
FIG. 13 is drawing for explaining the waveform conversion process of the lock-in amplifier in the case where the optical output signal and the control signal are in the same phase.
Figure 13B:
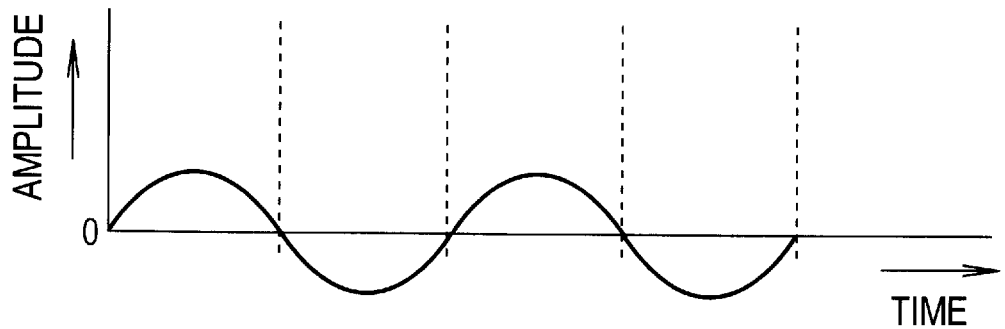
Figure 13C:
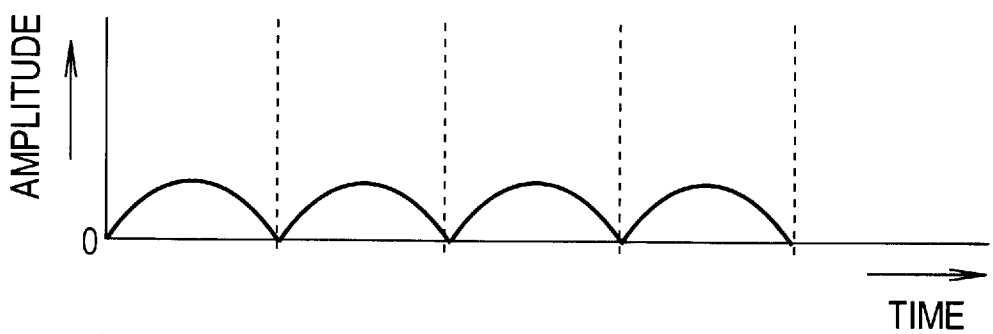
Figure 13D:
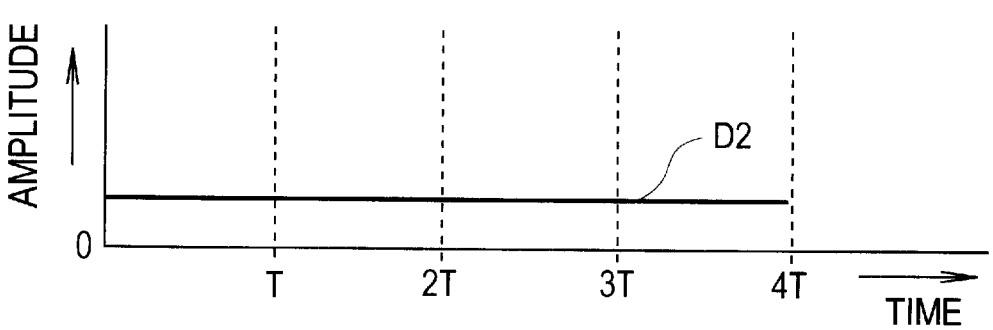
Figure 14A:
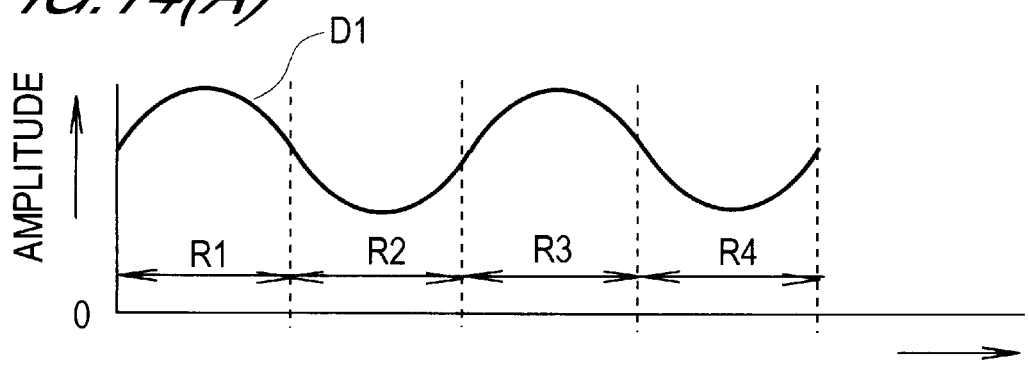
FIG. 14 is drawing for explaining the waveform conversion process of the lock-in amplifier in the case where the optical output signal and the control signal are in opposite phases.
Figure 14B:
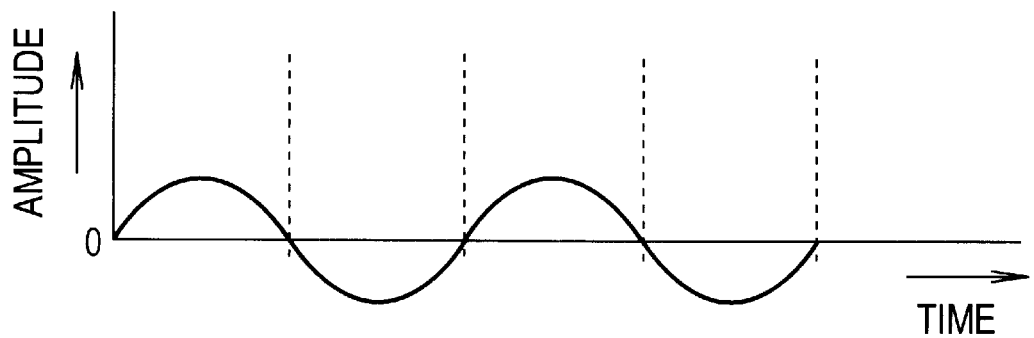
Figure 14C:
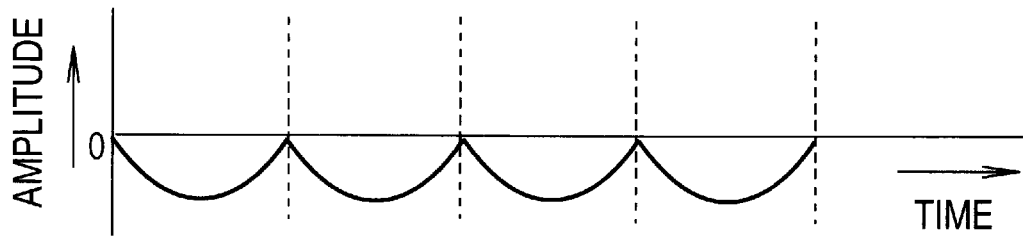
Figure 14D:
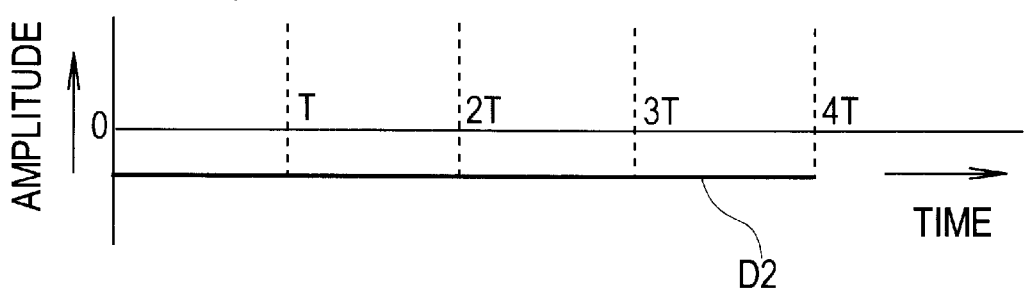
Figure 15A:
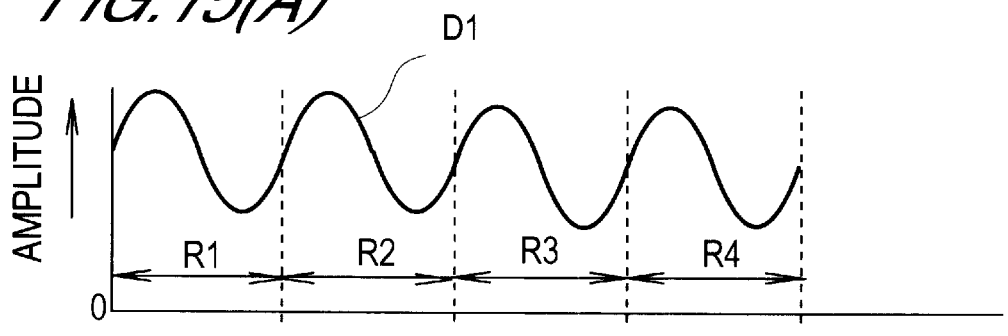
FIG. 15 is drawing for explaining the waveform conversion process of the lock-in amplifier in the case where the peak wavelength and the wavelength of the optical output signal match.
Figure 15B:
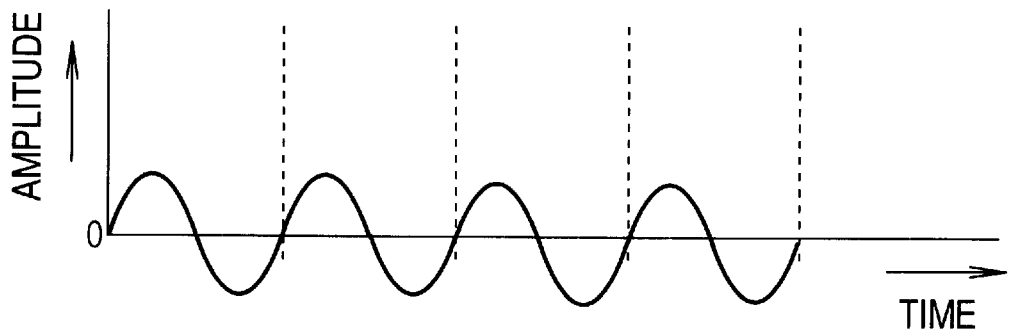
Figure 15C:
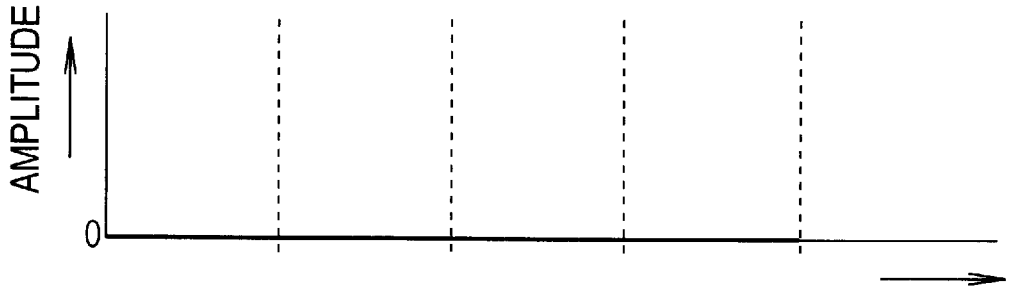
Figure 15D:
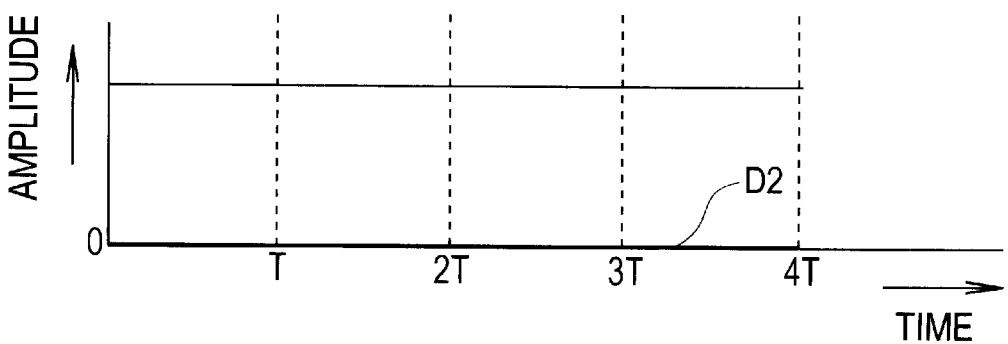

By removing the direct current component from the electric feedback monitoring signal S18 (D1 in FIG. 13(A), FIG. 14(A), and FIG. 15(A)), this lock-in amplifier 25 extracts the component of the amplitude frequency which is the alternating current component (see FIG. 13(B), FIG. 14(B), and FIG. 15(B)).

Next, this lock-in amplifier 25 converts this amplitude frequency component as discussed below to the direct current movement signal S28 so as to eliminate the divergence between the wavelength peak and the wavelength of the optical output signal S12.

The lock-in amplifier 25 marks off the waveform with the period T, i.e. the inverse of the detection frequency from the point where amplitude equals zero. These four marked off sections are defined in order of time as the first region R1, the second region R2, the third region R3, and the fourth region R4 (see FIGS. 13, 14, and 15). At this time, the modes of the first direct current signal S24 output from the lock-in amplifier 25 can be classified by the following three cases.

The first mode is the case where the alternating current component of the optical output signal S12 is the detection frequency and the optical output signal S12 and the control signal S20 are in the same phase. In this case, as shown in FIG. 10, the peak wavelength shifts to the short wavelength side with respect to the wavelength of the optical output signal S12. The lock-in amplifier 25 maintains the signal in the first region R1 and the third region R3 without changes and inverts the amplitude of the signal in the second region R2 and the fourth region R4. As a result, the amplitude of the signal in each region becomes positive (see FIG. 13(C)). Next, the lock-in amplifier 25 smoothes this signal and thereby outputs the result as the first direct current signal S24 with a positive direct current amplitude (D2 in FIG. 13(D)). Moreover, the amplitude of the first direct current signal S24 becomes high in proportion to the amplitude of the alternating current component of the optical output signal S12. Specifically, the size of the first direct current signal S24 is determined on the basis of amplitude of the optical output signal S12.

The second mode is the case where the alternating current component of the optical output signal S12 is the detection frequency and the optical output signal S12 and the control signal S20 are in opposite phases. In this case, as shown in FIG. 11, the peak wavelength shifts to the long wavelength side with respect to the wavelength of the optical output signal S12. The lock-in amplifier 25 maintains the signal in the second region R2 and the fourth region R4 without changes and inverts the amplitude of the signal in the first region R1 and the third region R3. As a result, the amplitude of the signal in each region becomes negative (see FIG. 14(C)). Next, the lock-in amplifier 25 smoothes this signal and thereby outputs the result as the first direct current signal S24 with a negative direct current amplitude (D2 in FIG. 14(D)). Moreover, the absolute value of the amplitude of the first direct current signal S24 becomes high in proportion to the amplitude of the alternating current component of the optical output signal S12. Specifically, the size of the first direct current signal S24 is determined on the basis of amplitude of the optical output signal S12.

The third mode is the case where the frequency of the alternating current component of the optical output signal S12 is twice the detection frequency. In this case, as shown in FIG. 12, the peak wavelength matches the wavelength of the optical output signal S12. The lock-in amplifier 25 maintains the signal in the second region R2 and the fourth region R4 without changes and inverts the amplitude of the signal in the first region R1 and the third region R3. Alternatively, the lock-in amplifier 25 maintains the signal in the first region R1 and the third region R3 without changes and inverts the amplitude of the signal in the second region R2 and the fourth region R4. As a result, the amplitude of the signal in each region becomes zero (see FIG. 15(C)). Next, the lock-in amplifier 25 smoothes this signal and thereby outputs the result as the first direct current signal S24 with an amplitude of zero (D2 in FIG. 15(D)).

The mode of the first direct current signal S24 output from the abovementioned lock-in amplifier 25 is determined as follows.

Specifically, in the case where the peak wavelength shifts to the short wavelength side with respect to the wavelength of the optical output signal S12, the amplitude of the first direct current signal S24 becomes positive. Also, in the case where the peak wavelength shifts to the long wavelength side with respect to the wavelength of the optical output signal S12, the amplitude of the first direct current signal S24 becomes negative. Also, when the peak wavelength matches the wavelength of the optical output signal S12, the amplitude of the first direct current signal S24 becomes zero.

The lock-in amplifier 25 then outputs this first direct current signal S24 to the amplitude amplifier 27.

This amplitude amplifier 27 outputs the second direct current signal S26, having the amplified amplitude of the first direct current signal S24 which was input from the lock-in amplifier 25, to the integrator 29.

This integrator 29 integrates this second direct current signal S26, converts that signal to the direct current movement signal S28, and outputs this signal to the adder 31.

This integrator 29 accumulates and adds these second direct current signals S26. In other words, this integrator 29 functions as a memory holder for the direct current movement signal S28 which is the cumulative sum of the second direct current signals S26. Accordingly, even if the input of the second direct current signal S26 to this integrator 29 is momentarily interrupted due to a temporary loss of the optical input signal, this integrator 29 continues to output the direct current movement signal S28 for filtering or branching the optical output signal S12 during that interval. Consequently, the rotation of the dielectric multilayer filter 101 can be controlled when the optical input signal S10 is present and in the same way when this optical input signal S10 is momentarily interrupted.

In the case where the peak wavelength shifts to the short wavelength side with respect to the wavelength of the optical output signal S12, the amplitude value (voltage) of this direct current movement signal S28 becomes greater. In the case where the peak wavelength shifts to the long wavelength side with respect to the wavelength of the optical output signal S12, the amplitude value (voltage) of this direct current movement signal S28 becomes smaller. In the case where the peak wavelength matches the wavelength of the optical output signal S12, the amplitude value (voltage) of this direct current movement signal S28 does not change.

However, as shown in FIG. 9, the peak wavelength becomes large when the voltage of the control signal S20 becomes large.

Accordingly, in the case where the peak wavelength shifts toward the short wavelength side with respect to the wavelength of the optical output signal S12, the peak wavelength becomes high because the voltage of this direct current movement signal S28 becomes even greater, as discussed above. Accordingly, the peak wavelength approaches the wavelength of the optical output signal S12. As a result, the divergence between the peak wavelength and the wavelength of the optical output signal S12 is eliminated. Consequently, the transmittance of the optical output signal S12 becomes the maximum.

Also, in the case where the peak wavelength shifts toward the long wavelength side with respect to the wavelength of the optical output signal S12, the peak wavelength becomes small because the voltage of this direct current movement signal S28 becomes even smaller, as discussed above. Accordingly, the peak wavelength approaches the wavelength of the optical output signal S12. As a result, the divergence between the peak wavelength and the wavelength of the optical output signal S12 is eliminated. Consequently, the transmittance of the optical output signal S12 becomes the maximum.

Also, in the case where the peak wavelength matches the wavelength of the optical output signal S12, the peak wavelength does not change because the voltage of this direct current movement signal S28 does not change, as discussed above. Accordingly, the peak wavelength does not change and continues to match the wavelength of the optical output signal S12. Consequently, the transmittance of the optical output signal S12 remains the maximum.

The integrator 29 outputs the direct current movement signal S28 having the abovementioned properties to the adder 31.

The alternating current detection signal generator 23 generates the abovementioned alternating current detection signal S22 for providing the alternating current component to the optical output signal S12 and outputs this signal to the adder 31.

The adder 31 outputs the control signal S20, which is the sum of this direct current movement signal S28 and the alternating current detection signal S22, to the optical wavelength filtering portion 11.

Consequently, by repeating the abovementioned feedback process, this first variable optical wavelength filter can control the rotation of this dielectric multilayer filter 101 when the optical input signal S10 is present, of course, and in the same way during a momentary loss of the optical input signal S10.

The present invention is not limited to only the abovementioned embodiment and can include various changes depending on the design.

Figure 16:
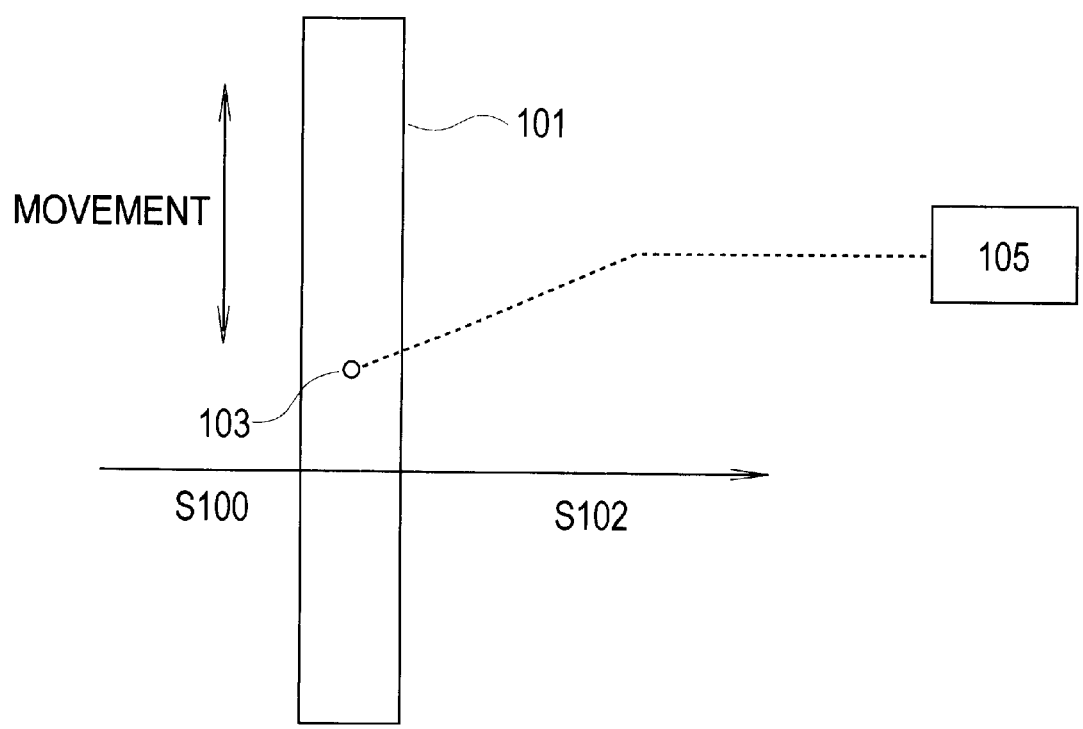
FIG. 16 is a drawing for explaining the movement of the optical wavelength filter.

For example, in the abovementioned embodiment, the actuator 105 causes the rotation of the dielectric multilayer filter 101 with the axis of rotation being the center line of the dielectric multilayer filter 101 and changes the specific wavelength, but may also move the dielectric multilayer filter 101 within a plane perpendicular to the direction at which the optical input signal S10 and (S100) is incident to dielectric multilayer filter 101 and change the specific wavelength. FIG. 16 is a drawing accompanying the explanation of the movement of the optical wavelength filter 101. The specific wavelength of this optical wavelength filter 101 changes according to the position of the surface.

Second Embodiment

The function of the variable optical wavelength filter according to the present invention will be explained with reference to FIGS. 3 and 4.

Figure 3:
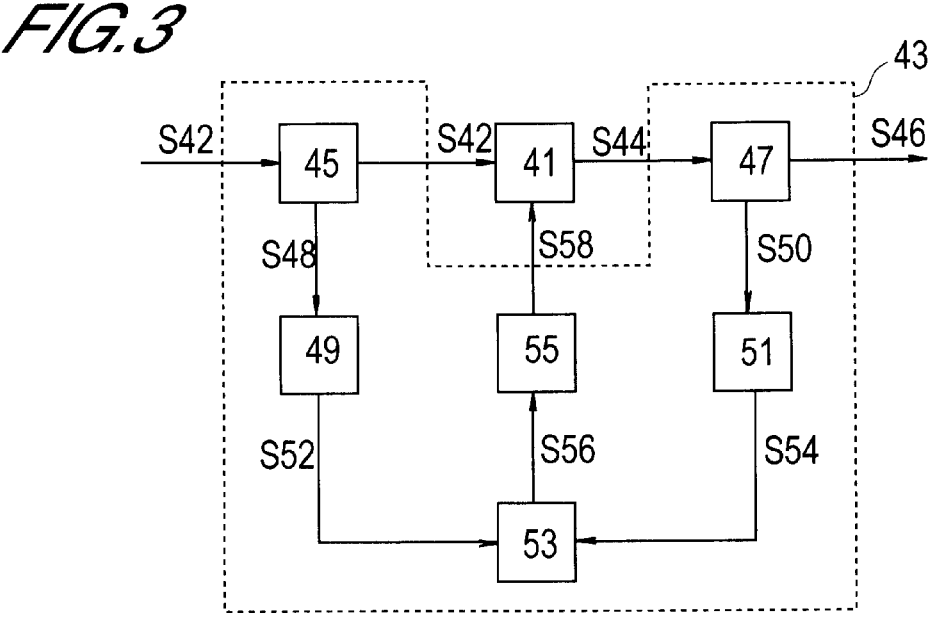
FIG. 3 is a block diagram for explaining the constitution of the variable optical wavelength filter according to the second embodiment of the present invention.

FIG. 3 is a block diagram for explaining the function of the variable optical wavelength filter according to the second embodiment of the present invention. This variable optical wavelength filter is hereinafter referred to as the second variable optical wavelength filter.

This second variable optical wavelength filter comprises a dielectric multilayer filter 101 for selecting the wavelength of the optical output signal S44 from the wavelength of the optical input signal S42 and outputting or filtering or branching the optical output signal S44. Furthermore, even if the wavelength of the optical input signal S42 varies as discussed above, this second variable optical wavelength filter is able to sustain the maximum transmittance of the optical output signal S44 by causing the rotation of the dielectric multilayer filter 101, corresponding to the variations in wavelength, so as to provide the maximum transmission peak of the dielectric multilayer filter 101 to the optical output signal S44.

This second variable optical wavelength filter comprises an optical wavelength filtering portion 41 having a dielectric multilayer filter 101 for selecting the specific wavelength from the wavelength of the optical input signal S42 to provide the maximum transmission peak to the optical output signal S44, and an optical wavelength filter control system 43. In this second embodiment, this specific wavelength means the peak wavelength discussed above.

This optical wavelength filter control system 43 comprises an optical wavelength filter control portion 55 having a direct current component forming portion 57, an alternating current detection signal generator 59, and an adder 67; first and second beam splitting portions 45 and 47; first and second photoelectric converting portions 49 and 51; and a divider 53.

The flow of the signals in this second variable optical wavelength filter will be explained below with reference to FIGS. 3 and 4.

The optical input signal S42 is input to the first beam splitting portion 45 from outside the system. The first beam splitting portion 45 splits this optical input signal S42 into a first optical monitoring signal S48 and an optical input signal S42. As discussed below, this first optical monitoring signal S48 is used for removing the signal component caused by variations in wavelength of the optical input signal S42 from the electric feedback monitoring signal S56 output to the optical wavelength filter control portion 55.

So that the peak wavelength of the dielectric multilayer filter 101 is generally matched to the wavelength of the optical output signal S44 in advance, the direct current component forming portion 57 in the optical wavelength filter control portion 55 outputs the direct current movement signal S66. At the same time, the alternating current detection signal generator 59 is caused to generate the alternating current detection signal S60 with the detection frequency. This detection frequency is continuously constant. The adder 67 adds the direct current movement signal S66 and the alternating current detection signal S60 and outputs the result as the control signal S58 to the optical wavelength filtering portion 41.

Next, the actuator 105 of the optical wavelength filtering portion 41 converts the control signal S58 input from the abovementioned optical wavelength filter control portion 55 to power for causing the rotation of the dielectric multilayer filter 101. In this case, the dielectric multilayer filter 101 rotates on the basis of the direct current movement signal S66 in the control signal S58, so that the wavelength for generally providing the transmission wavelength peak to the optical output signal S44 is selected from the wavelength of the optical input signal S42. At the same time, the dielectric wavelength filter 101 rotates slightly on the basis of the alternating current detection signal S60 in the control signal S58. As discussed above, the frequency of the alternating current detection signal S60 is the detection frequency and corresponding to this, the frequency of the slight rotation of the dielectric multilayer filter 101 also becomes the detection frequency.

Rhythm is provided to the amplitude of the optical output signal S44 by the slight rotation of this dielectric multilayer filter 101. The frequency of the amplitude of this rhythm is the amplitude frequency as discussed above. Specifically, the frequency of the alternating current component of the optical output signal S44 is the amplitude frequency.

The relationship between the waveform and phase of this optical output signal S44 and the alternating current detection signal S60 in the control signal S58 is as discussed above.

Specifically, in the case where the peak wavelength shifts to the long or short wavelength side with respect to the wavelength of the optical output signal S44 (see FIGS. 10 and 11), the amplitude frequency of the alternating current component of the optical output signal S44 (corresponds to C4) becomes the detection frequency. Also, in the case where the peak wavelength matches the wavelength of the optical output signal S44 (see FIG. 12), the amplitude frequency of the alternating current component of the optical output signal S44 becomes twice the detection frequency.

Furthermore, in the case where the peak wavelength shifts toward the short wavelength side with respect to the wavelength of the optical output signal S44 (see FIG. 10), the optical output signal S44 is in the same phase as the alternating current detection signal S60 (corresponds to C1) in the control signal S58. In the case where the peak wavelength shifts toward the long wavelength side with respect to the wavelength of the optical output signal S44 (see FIG. 11), the optical output signal S44 is in the phase opposite to the alternating current detection signal S60 in the control signal S58.

The optical output signal S44 having this amplitude frequency is output to the second beam splitting portion 47 of the abovementioned optical wavelength filter control system 43.

This second beam splitting portion 47 splits the optical output signal S44 input from the optical wavelength filtering portion 41 into a second monitoring optical signal S50 and an optical main signal S46. This optical main signal S46 is converted to sound or an image after being output from the second variable optical wavelength filter.

Next, the second photoelectric converting portion 51 converts the second optical monitoring signal S50 input from the second beam splitting portion 47 to a second electric monitoring signal S54 and outputs this second electric monitoring signal S54 to the divider 53. Also, the first photoelectric converting portion 49 converts the first optical monitoring signal S48 input from the abovementioned first beam splitting portion 45 to a first electric monitoring signal S52 and outputs this first electric monitoring signal S52 to the divider 53.

Next, the divider 53 divides the second electric monitoring signal S54 input from the second photoelectric converting portion 51 by the first electric monitoring signal S52 input from the first photoelectric converting portion 49, and outputs the result as the electric feedback monitoring signal S56 to the optical wavelength filter control portion 55.

The amplitude of the optical output signal S44 becomes the product of the amplitude of the optical input signal S42 and the transmittance of the abovementioned dielectric multilayer filter 101 which vibrates slightly at the detection frequency, in the case where the optical input signal S42 is a single wavelength beam. The components of the optical input signal S42 and optical output signal S44 are equivalent respectively to the components of the first and second electric monitoring signals S52 and S54. Consequently, the amplitude of the second electric monitoring signal S54 becomes the product of the amplitude of the first electric monitoring signal S52 and the transmittance of the dielectric multilayer filter 101 which vibrates slightly at the detection frequency. Accordingly, by dividing the second electric monitoring signal S54 by the first electric monitoring signal S52, the abovementioned divider 53 can output to the abovementioned optical wavelength filter control portion 55 an electric feedback monitoring signal S56 that is a signal with the component of the first electric monitoring signal S52 removed from the second electric monitoring signal S54. As discussed above, the component of the first electric monitoring signal S52 is equivalent to the component of the optical input signal S42. As a result, the component of the optical input signal S42 is not included in the electric feedback monitoring signal S56 output to the optical wavelength filter control portion 55. Accordingly, even if the intensity of the optical input signal S42 varies, the electric feedback monitoring signal S56 does not include the component resulting from the variations in intensity of the optical input signal S42.

As discussed below, the optical wavelength filter control portion 55 extracts the alternating current component from this electric feedback monitoring signal S56 and controls the position of the dielectric multilayer filter 101 on the basis of that alternating current component. The alternating current component does not include the variable component resulting from the variations in wavelength of the optical input signal S42. Accordingly, this optical wavelength filter control portion 55 can control the dielectric multilayer filter 101 regardless of the variations in wavelength of the optical input signal S42 because of being able to output to the optical wavelength filtering portion 41 a control signal S58 for providing the maximum transmission peak to the optical output signal S44.

As in the first embodiment, the optical wavelength filter control portion 55 in the second embodiment comprises a direct current component forming portion 57 having a lock-in amplifier 61, an amplitude amplifier 63, and an integrator 65; an alternating current detection signal generator 59; and an adder 67.

Figure 4:
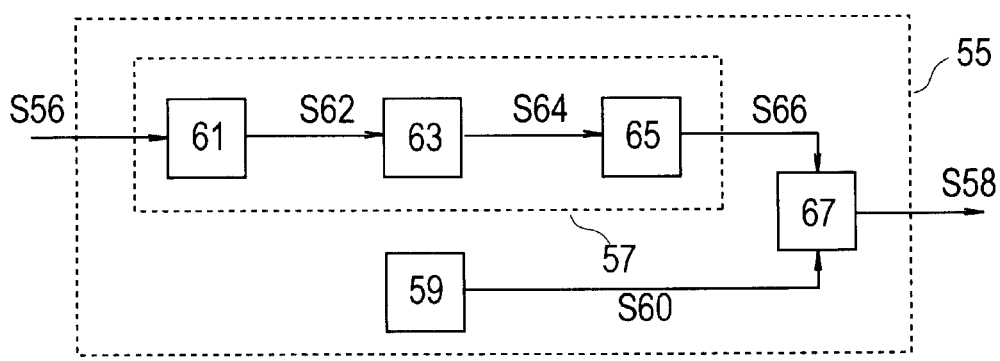
FIG. 4 is a block diagram for explaining the constitution of the optical wavelength filter control portion according to the second embodiment of the present invention.

FIG. 4 is a drawing for explaining the function of the optical wavelength filter control portion 55.

The electric feedback monitoring signal S56 output from the abovementioned divider 53 is input to the lock-in amplifier 61. On the basis of the amplitude frequency, phase, and amplitude of the alternating current component of the optical output signal S44, this lock-in amplifier 61 converts the alternating current component of the optical output signal S44 to a first direct current signal S62 that forms the pattern for the direct current movement signal S66 for controlling the rotation of the dielectric multilayer filter 101.

By removing the direct current component from the electric feedback monitoring signal S56 (D1 in FIG. 13(A), FIG. 14(A), and FIG. 15(A)), this lock-in amplifier 61 extracts the component of the amplitude frequency which is the alternating current component (see FIG. 13(B), FIG. 14(B), and FIG. 15(B)).

Next, this lock-in amplifier 61 converts this amplitude frequency component to the direct current movement signal S66 so as to eliminate the divergence between the wavelength peak and the wavelength of the optical output signal S44.

The lock-in amplifier 61 marks off the waveform with the period T, i.e. inverse of the detection frequency from the point where amplitude equals zero. These four marked off sections are defined in order of time as the first region R1, the second region R2, the third region R3, and the fourth region R4 (see FIGS. 13, 14, and 15). At this time, the modes of the first direct current signal S62 output from the lock-in amplifier 61 can be classified by the following three cases.

The first mode is the case where the alternating current component of the optical output signal S44 is the detection frequency and the optical output signal S44 and the control signal S58 are in the same phase. In this case, as shown in FIG. 10, the peak wavelength shifts to the short wavelength side with respect to the wavelength of the optical output signal S44. The lock-in amplifier 61 maintains the signal in the first region R1 and the third region R3 without changes and inverts the amplitude of the signal in the second region R2 and the fourth region R4. As a result, the amplitude of the signal in each region becomes positive (see FIG. 13(C)). Next, the lock-in amplifier 61 smoothes this signal and thereby outputs the result as the first direct current signal S62 with a positive direct current amplitude (D2 in FIG. 13(D)). Moreover, the amplitude of the first direct current signal S62 becomes high in proportion to the amplitude of the alternating current component of the optical output signal S44. Specifically, the size of the first direct current signal S62 is determined on the basis of amplitude of the optical output signal S44.

The second mode is the case where the alternating current component of the optical output signal S44 is the detection frequency and the optical output signal S44 and the control signal S58 are in opposite phases. In this case, as shown in FIG. 11, the peak wavelength shifts to the long wavelength side with respect to the wavelength of the optical output signal S44. The lock-in amplifier 61 maintains the signal in the second region R2 and the fourth region R4 without changes and inverts the amplitude of the signal in the first region R1 and the third region R3. As a result, the amplitude of the signal in each region becomes negative (see FIG. 14(C)) Next, the lock-in amplifier 61 smoothes this signal and thereby outputs the result as the first direct current signal S62 with a negative direct current amplitude (D2 in FIG. 14(D)). Moreover, the absolute value of the amplitude of the first direct current signal S62 becomes high in proportion to the amplitude of the alternating current component of the optical output signal S44. Specifically, the size of the first direct current signal S62 is determined on the basis of amplitude of the optical output signal S44.

The third mode is the case where the frequency of the alternating current component of the optical output signal S44 is twice the detection frequency. In this case, as shown in FIG. 12, the peak wavelength matches the wavelength of the optical output signal S44. The lock-in amplifier 61 maintains the signal in the second region R2 and the fourth region R4 without changes and inverts the amplitude of the signal in the first region R1 and the third region R3. Alternatively, the lock-in amplifier 61 maintains the signal in the first region R1 and the third region R3 without changes and inverts the amplitude of the signal in the second region R2 and the fourth region R4. As a result, the amplitude of the signal in each region becomes zero (see FIG. 15(C)). Next, the lock-in amplifier 61 smoothes this signal and thereby outputs the result as the first direct current signal S62 with an amplitude of zero (D2 in FIG. 15(D)).

The mode of the first direct current signal S62 output from the abovementioned lock-in amplifier 61 is determined as follows. Specifically, in the case where the peak wavelength shifts to the short wavelength side with respect to the wavelength of the optical output signal S44, the amplitude of the first direct current signal S62 becomes positive. Also, in the case where the peak wavelength shifts to the long wavelength side with respect to the wavelength of the optical output signal S44, the amplitude of the first direct current signal S62 becomes negative. Also, when the peak wavelength matches the wavelength of the optical output signal S44, the amplitude of the first direct current signal S62 becomes zero.

Moreover, as discussed above, the varying component caused by the variations in wavelength of the optical input signal S42 is not included in the alternating current component extracted by the lock-in amplifier 61 from the electric feedback monitoring signal S56. Accordingly, as discussed below, the lock-in amplifier 61 can convert the electric feedback monitoring signal S56, which was input, to a first direct current signal S62 for eliminating the divergence between the wavelength peak and wavelength of the optical output signal S44. Consequently, as discussed below, the optical wavelength filter control portion 55 can control this dielectric multilayer filter 101 because of being able to output the control signal S58 for applying the maximum transmission peak to the optical output signal S44 to the optical wavelength filtering portion 41.

When the varying component caused by variations in the intensity of the optical input signal S42 is temporarily included in this alternating current component and the frequency of these variations in the intensity matches the detection frequency, the lock-in amplifier 61 also extracts the alternating current component with the detection frequency caused by these variations in intensity. This alternating current component becomes noise with the conversion of the electric feedback monitoring signal S56 which was input by the lock-in amplifier 61 to the first direct current signal S62 for eliminating the divergence between the wavelength peak in the wavelength of the optical output signal S44.

The lock-in amplifier 61 then outputs this first direct current signal S62 to the amplitude amplifier 63.

This amplitude amplifier 63 outputs the second direct current signal S64, having the amplified amplitude of the first direct current signal S62 which was input from the lock-in amplifier 61, to the integrator 65.

This integrator 65 integrates this second direct current signal S64, converts that signal to the direct current movement signal S66, and outputs this signal to the adder 67.

This integrator 65 accumulates and adds these second direct current signals S64. In other words, this integrator 65 functions as a memory holder for the direct current movement signal S66 which is the cumulative sum of the second direct current signals S64. Accordingly, even if the input of the second direct current signal S64 to this integrator 65 is momentarily interrupted due to a temporary loss of the optical input signal, this integrator 65 continues to output the direct current movement signal S66 for filtering or branching the optical output signal S44 during that interval. Consequently, the rotation of the dielectric multilayer filter 101 can be controlled when the optical input signal S42 is present and in the same way when this optical input signal S42 is momentarily interrupted.

In the case where the peak wavelength shifts to the short wavelength side with respect to the wavelength of the optical output signal S44, the amplitude value (voltage) of this direct current movement signal S66 becomes greater. In the case where the peak wavelength shifts to the long wavelength side with respect to the wavelength of the optical output signal S44, the amplitude value (voltage) of this direct current movement signal S66 becomes smaller. In the case where the peak wavelength matches the wavelength of the optical output signal S44, the amplitude value (voltage) of this direct current movement signal S66 does not change.

However, as shown in FIG. 9, the peak wavelength becomes large when the voltage of the control signal S58 becomes large.

Accordingly, in the case where the peak wavelength shifts toward the short wavelength side with respect to the wavelength of the optical output signal S44, the peak wavelength becomes high because the voltage of this direct current movement signal S66 becomes even greater, as discussed above. Accordingly, the peak wavelength approaches the wavelength of the optical output signal S44. As a result, the divergence between the peak wavelength and the wavelength of the optical output signal S44 is eliminated. Consequently, the transmittance of the optical output signal S44 becomes the maximum.

Also, in the case where the peak wavelength shifts toward the long wavelength side with respect to the wavelength of the optical output signal S44, the peak wavelength becomes small because the voltage of this direct current movement signal S66 becomes even smaller, as discussed above. Accordingly, the peak wavelength approaches the wavelength of the optical output signal S44. As a result, the divergence between the peak wavelength and the wavelength of the optical output signal S44 is eliminated. Consequently, the transmittance of the optical output signal S44 becomes the maximum.

Also, in the case where the peak wavelength matches the wavelength of the optical output signal S44, the peak wavelength does not change because the voltage of this direct current movement signal S66 does not change, as discussed above. Accordingly, the peak wavelength does not change and continues to match the wavelength of the optical output signal S44. Consequently, the transmittance of the optical output signal S44 remains the maximum.

The integrator 65 outputs the direct current movement signal S66 having the abovementioned properties to the adder 67.

The alternating current detection signal generator 59 generates the abovementioned alternating current detection signal S60 for providing the alternating current component to the optical output signal S44 and outputs this signal to the adder 67.

The adder 67 outputs the control signal S58, which is the sum of this direct current movement signal S66 and the alternating current detection signal S60, to the optical wavelength filtering portion 41.

Consequently, by repeating the abovementioned feedback process, this second variable optical wavelength filter can control the rotation of this dielectric multilayer filter 101 when the optical input signal S42 is present, of course, and in the same way during a momentary loss of the optical input signal S42.

The present invention is not limited to only the abovementioned embodiment and can include various changes depending on the design.

For example, in the abovementioned embodiment, the actuator 105 causes the rotation of the dielectric multilayer filter 101 with the axis of rotation being the center line of the dielectric multilayer filter 101 and changes the specific wavelength, but may also move the dielectric multilayer filter 101 within a plane perpendicular to the direction at which the optical input signal S42 (S100) is incident to the dielectric multilayer filter 101 and change the specific wavelength. FIG. 16 is a drawing for explaining the movement of the optical wavelength filter 101. The specific wavelength of this optical wavelength filter 101 changes according to the position of the surface.

Third Embodiment

The function of the variable optical wavelength filter according to the present invention will be explained with reference to FIGS. 5 and 6.

Figure 5:
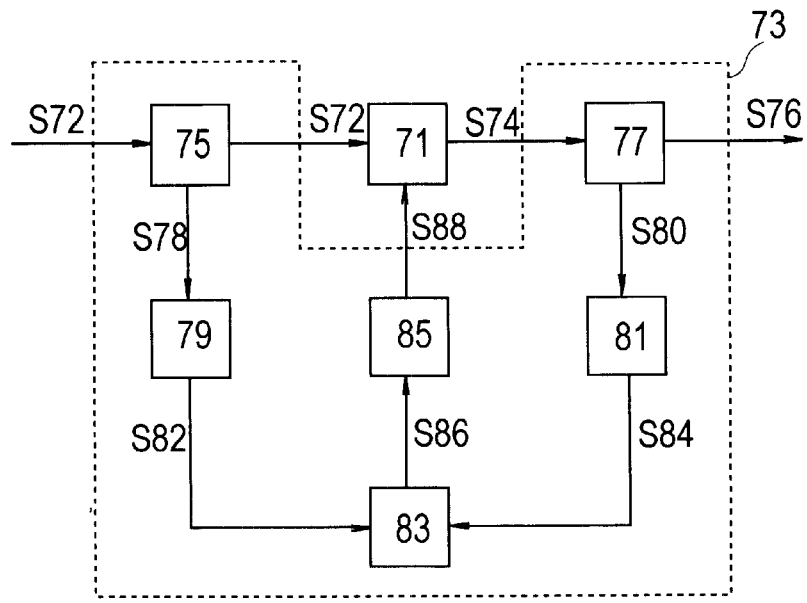
FIG. 5 is a block diagram for explaining the constitution of the variable optical wavelength filter according to the third embodiment of the present invention.

FIG. 5 is a drawing for explaining the function of the variable optical wavelength filter according to the third embodiment. This variable optical wavelength filter is hereinafter referred to as the third variable optical wavelength filter.

This third variable optical wavelength filter comprises a dielectric multilayer filter 101 for outputting or filtering or branching the optical output signal S74 from the optical input signal S72. Furthermore, even if the wavelength of the optical input signal S72 varies, this third variable optical wavelength filter is able to substantially sustain the maximum transmittance of the optical output signal S74 by causing the rotation of the dielectric multilayer filter 101 as discussed below, corresponding to the wavelength of the varying optical input signal S72.

Unlike the first and second variable optical wavelength filters, this third variable optical wavelength filter has a different transmittance of the dielectric multilayer filter 101 provided to the optical output signal S74 corresponding to the wavelength of the optical input signal S72, when selecting the wavelength of the optical output signal S74. Specifically, when the wavelength of the optical output signal S74 matches a predetermined reference wavelength (discussed below), the third variable optical wavelength filter causes the dielectric multilayer filter 101 to rotate so as to select the wavelength for providing the maximum transmission peak to the optical output signal S74 from the wavelength of the optical input signal S72 as the specific wavelength. Alternatively, in the case where there is a difference between the wavelength of the optical output signal S74 and the reference wavelength, this third variable optical wavelength filter causes the dielectric multilayer filter 101 to rotate so as to select the wavelength for providing a transmittance slightly less than the maximum transmission peak to the optical output signal S74 from the wavelength of the optical input signal S72 according to this difference.

Actually, in this third embodiment, the peak wavelength is slightly smaller than the wavelength of the optical output signal S74 when the wavelength of the optical output signal S74 is greater than the reference wavelength. In this case, the difference between the wavelengths becomes higher in proportion to the amount by which the wavelength of the optical output signal S74 is greater than the reference wavelength. In other words, the transmittance provided to the optical output signal S74 becomes smaller in proportion to the amount by which the wavelength of the optical output signal S74 is greater than the reference wavelength.

Also, when the wavelength of the optical output signal S74 is less than the reference wavelength, the peak wavelength is slightly greater than the wavelength of the optical output signal S74. In this case, the difference between the wavelengths becomes higher in proportion to the amount by which the wavelength of the optical output signal S74 is smaller than the reference wavelength. In other words, the transmittance provided to the optical output signal S74 becomes smaller in proportion to the amount by which the wavelength of the optical output signal S74 is smaller than the reference wavelength.

In this way, this third variable optical wavelength filter substantially provides the maximum transmittance to the optical output signal S74 by slightly diverging the specific wavelength from the peak wavelength according to the difference between the wavelength of the optical output signal S74 and the reference wavelength.

Moreover, the reference wavelength is the peak wavelength when the voltage of the direct current movement signal S98 which is the direct current component of the control signal S88 output from the optical wavelength filter control portion 85 to the optical wavelength filtering portion 71 is equal to the voltage of the reference bias signal S96. Also, the position of the dielectric multilayer filter 101 when the specific wavelength is the reference wavelength is called the standard position.

This third variable optical wavelength filter comprises an optical wavelength filtering portion 71 having a dielectric multilayer filter 101 for selecting the wavelength of the optical output signal S74 including the specific wavelength, and an optical wavelength filter control system 73.

This optical wavelength filter control system 73 comprises an optical wavelength filter control portion 85 having a direct current component forming portion 87, an alternating current detection signal generator 89, and a first adder 99; first and second beam splitting portions 75 and 77; first and second photoelectric converting portions 79 and 81; and a divider 83.

The flow of the signals in this third variable optical wavelength filter will be explained below with reference to FIGS. 4 and 5.

The optical input signal S72 is input to the first beam splitting portion 75 from outside the system. The first beam splitting portion 75 splits this optical input signal S72 into a first optical monitoring signal S78 and an optical input signal S72. As discussed below, this first optical monitoring signal S78 is used for removing the signal component caused by variations in intensity of the optical input signal S72 from the electric feedback monitoring signal S86 output to the optical wavelength filter control portion 85.

So that the peak wavelength of the dielectric multilayer filter 101 is generally matched to the wavelength of the optical output signal S74 in advance, the direct current component forming portion 87 in the optical wavelength filter control portion 85 outputs the direct current movement signal S98. At the same time, the alternating current detection signal generator 89 is caused to generate the alternating current detection signal S90 with the detection frequency. This detection frequency is continuously constant. The first adder 99 adds the direct current movement signal S98 and the alternating current detection signal S90 and outputs the result as the control signal S88 to the optical wavelength filtering portion 71.

Next, the actuator 105 of the optical wavelength filtering portion 71 converts the control signal S88 input from the abovementioned optical wavelength filter control portion 85 to power for causing the rotation of the dielectric multilayer filter 101. In this case, the dielectric multilayer filter 101 rotates on the basis of the direct current movement signal S98 in the control signal S88, so that the wavelength for generally providing the transmission wavelength peak to the optical output signal S74 is selected from the wavelength of the optical input signal S72. At the same time, the dielectric wavelength filter 101 rotates slightly on the basis of the alternating current detection signal S90 in the control signal S88. As discussed above, the frequency of the alternating current detection signal S90 is the detection frequency and corresponding to this, the frequency of the slight rotation of the dielectric multilayer filter 101 also becomes the detection frequency.

Rhythm is provided to the amplitude of the optical output signal S74 by the slight rotation of this dielectric multilayer filter 101. The frequency of the amplitude of this rhythm is the amplitude frequency as discussed above. Specifically, the frequency of the alternating current component of the optical output signal S74 is the amplitude frequency.

The relationship between the waveform and phase of this optical output signal S74 and the alternating current detection signal S90 in the control signal S88 is as discussed above.

Specifically, in the case where the peak wavelength shifts to the long or short wavelength side with respect to the wavelength of the optical output signal S74 (see FIGS. 10 and 11), the amplitude frequency of the alternating current component of the optical output signal S74 (corresponds to C4) becomes the detection frequency. Also, in the case where the peak wavelength matches the wavelength of the optical output signal S74 (see FIG. 12), the amplitude frequency of the alternating current component of the optical output signal S74 becomes twice the detection frequency.

Furthermore, in the case where the peak wavelength shifts toward the short wavelength side with respect to the wavelength of the optical output signal S74 (see FIG. 10), the optical output signal S74 is in the same phase as the alternating current detection signal S90 (corresponds to C1) in the control signal S88. In the case where the peak wavelength shifts toward the long wavelength side with respect to the wavelength of the optical output signal S74 (see FIG. 11), the optical output signal S74 is in the phase opposite to the alternating current detection signal S90 in the control signal S88.

Moreover, as discussed above, the peak wavelength shifting towards the short wavelength side with respect to the wavelength of the optical output signal S74 occurs when the wavelength of the optical output signal S74 is greater than the reference wavelength. Also, the peak wavelength shifting towards the long wavelength side with respect to the wavelength of the optical output signal S74 occurs when the wavelength of the optical output signal S74 is less than the reference wavelength. Also, when the peak wavelength matches the wavelength of the optical output signal S74, these wavelengths match the reference wavelength.

The optical output signal S74 having this amplitude frequency is output to the second beam splitting portion 77 of the abovementioned optical wavelength filter control system 73.

This second beam splitting portion 77 splits the optical output signal S74 input from the optical wavelength filtering portion 71 into a second monitoring optical signal S80 and an optical main signal S76. This optical main signal S76 is converted to sound or an image after being output from the third variable optical wavelength filter.

Next, the second photoelectric converting portion 81 converts the second optical monitoring signal S80 input from the second beam splitting portion 77 to a second electric monitoring signal S84 and outputs this second electric monitoring signal S84 to the divider 83. Also, the first photoelectric converting portion 79 converts the first optical monitoring signal S78 input from the abovementioned first beam splitting portion 75 to a first electric monitoring signal S82 and outputs this first electric monitoring signal S82 to the divider 83.

Next, the divider 83 divides the second electric monitoring signal S84 input from the second photoelectric converting portion 81 by the first electric monitoring signal S82 input from the first photoelectric converting portion 79, and outputs the result as the electric feedback monitoring signal S86 to the optical wavelength filter control portion 85.

The amplitude of the optical output signal S74 becomes the product of the amplitude of the optical input signal S72 and the transmittance of the abovementioned dielectric multilayer filter 101 which vibrates slightly at the detection frequency, in the case where the optical input signal S72 is a single wavelength beam. The components of the optical input signal S72 and optical output signal S74 are equivalent respectively to the components of the first and second electric monitoring signals S82 and S84. Consequently, the amplitude of the second electric monitoring signal S84 becomes the product of the amplitude of the first electric monitoring signal S82 and the transmittance of the dielectric multilayer filter 101 which vibrates slightly at the detection frequency. Accordingly, by dividing the second electric monitoring signal S84 by the first electric monitoring signal S82, the abovementioned dividing portion 83 can output to the abovementioned optical wavelength filter control portion 85 an electric feedback monitoring signal S86 that is a signal with the component of the first electric monitoring signal S82 removed from the second electric monitoring signal S84. As discussed above, the component of the first electric monitoring signal S82 is equivalent to the component of the optical input signal S72. As a result, the component of the optical input signal S72 is not included in the electric feedback monitoring signal S86 output to the optical wavelength filter control portion 85. Accordingly, even if the wavelength of the optical input signal S72 varies, the electric feedback monitoring signal S86 does not include the component resulting from the variations in intensity of the optical input signal S72.

As discussed below, the optical wavelength filter control portion 85 extracts the alternating current component from this electric feedback monitoring signal S86 and controls the position of the dielectric multilayer filter 101 on the basis of that alternating current component. The alternating current component does not include the variable component resulting from the variations in intensity of the optical input signal S72. Accordingly, this optical wavelength filter control portion 85 can control the dielectric multilayer filter 101 regardless of the variations in intensity of the optical input signal S72 because of being able to output to the optical wavelength filtering portion 71 a control signal S88 for providing the maximum transmission peak to the optical output signal S74.

In the third embodiment, the optical wavelength filter control portion 85 comprises a direct current component forming portion 87 having a lock-in amplifier 91, an amplitude amplifier 93, a reference bias signal generator 95, and a second adder 97; an alternating current detection signal generator 89; and a first adder 99.

Figure 6:
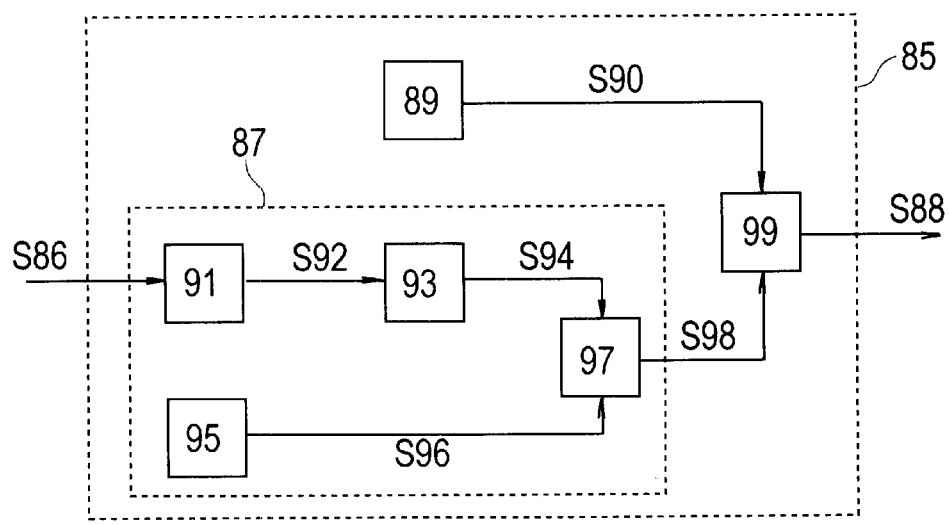
FIG. 6 is a block diagram for explaining the constitution of the optical wavelength filter control portion according to the third embodiment of the present invention.

FIG. 6 is a drawing for explaining the function of the optical wavelength filter control portion 85.

The electric feedback monitoring signal S86 output from the abovementioned divider 83 is input to the lock-in amplifier 91. On the basis of the amplitude frequency, phase, and amplitude of the alternating current component of the optical output signal S74, this lock-in amplifier 91 converts the alternating current component of the optical output signal S74 to a first direct current signal S92 that forms the pattern for the direct current movement signal S98 for controlling the rotation of the dielectric multilayer filter 101.

By removing the direct current component from the electric feedback monitoring signal S86 (D1 in FIG. 13(A), FIG. 14(A), and FIG. 15(A)), this lock-in amplifier 91 extracts the component of the amplitude frequency which is the alternating current component (see FIG. 13(B), FIG. 14(B), and FIG. 15(B)).

Next, this lock-in amplifier 91 converts this amplitude frequency component to the direct current movement signal S98 so as to eliminate the divergence between the wavelength peak and the wavelength of the optical output signal S74.

The lock-in amplifier 91 marks off the waveform with the period T, i.e. inverse of the detection frequency from the point where amplitude equals zero. These four marked off sections are defined in order of time as the first region R1, the second region R2, the third region R3, and the fourth region R4 (see FIGS. 13, 14, and 15). At this time, the modes of the first direct current signal S92 output from the lock-in amplifier 91 can be classified by the following three cases.

The first mode is the case where the alternating current component of the optical output signal S74 is the detection frequency and the optical output signal S74 and the control signal S88 are in the same phase. In this case, as shown in FIG. 10, the peak wavelength shifts to the short wavelength side with respect to the wavelength of the optical output signal S74. The lock-in amplifier 91 maintains the signal in the first region R1 and the third region R3 without changes and inverts the amplitude of the signal in the second region R2 and the fourth region R4. As a result, the amplitude of the signal in each region becomes positive (see FIG. 13(C)). Next, the lock-in amplifier 91 smoothes this signal and thereby outputs the result as the first direct current signal S92 with a positive direct current amplitude (D2 in FIG. 13(D)). Moreover, the amplitude of the first direct current signal S92 becomes high in proportion to the amplitude of the alternating current component of the optical output signal S74. Specifically, the size of the first direct current signal S92 is determined on the basis of amplitude of the optical output signal S74.

The second mode is the case where the alternating current component of the optical output signal S74 is the detection frequency and the optical output signal S74 and the control signal S88 are in opposite phases. In this case, as shown in FIG. 11, the peak wavelength shifts to the long wavelength side with respect to the wavelength of the optical output signal S74. The lock-in amplifier 91 maintains the signal in the second region R2 and the fourth region R4 without changes and inverts the amplitude of the signal in the first region R1 and the third region R3. As a result, the amplitude of the signal in each region becomes negative (see FIG. 14(C)) Next, the lock-in amplifier 91 smoothes this signal and thereby outputs the result as the first direct current signal S92 with a negative direct current amplitude (D2 in FIG. 14(D)). Moreover, the absolute value of the amplitude of the first direct current signal S92 becomes high in proportion to the amplitude of the alternating current component of the optical output signal S74. Specifically, the size of the first direct current signal S92 is determined on the basis of amplitude of the optical output signal S74.

The third mode is the case where the frequency of the alternating current component of the optical output signal S74 is twice the detection frequency. In this case, as shown in FIG. 12, the peak wavelength matches the wavelength of the optical output signal S74. The lock-in amplifier 91 maintains the signal in the second region R2 and the fourth region R4 without changes and inverts the amplitude of the signal in the first region R1 and the third region R3. Alternatively, the lock-in amplifier 91 maintains the signal in the first region R1 and the third region R3 without changes and inverts the amplitude of the signal in the second region R2 and the fourth region R4. As a result, the amplitude of the signal in each region becomes zero (see FIG. 15(C)). Next, the lock-in amplifier 91 smoothes this signal and thereby outputs the result as the first direct current signal S92 with an amplitude of zero (D2 in FIG. 15(D)).

The mode of the first direct current signal S92 output from the abovementioned lock-in amplifier 91 is determined as follows.

Specifically, in the case where the peak wavelength shifts to the short wavelength side with respect to the wavelength of the optical output signal S74, the amplitude of the first direct current signal S92 becomes positive. Also, in the case where the peak wavelength shifts to the long wavelength side with respect to the wavelength of the optical output signal S74, the amplitude of the first direct current signal S92 becomes negative. Also, when the peak wavelength matches the wavelength of the optical output signal S74, the amplitude of the first direct current signal S92 becomes zero.

However, as discussed above, in the case where the peak wavelength shifts to the short wavelength side with respect to the wavelength of the optical output signal S74, the wavelength of the optical output signal S74 becomes continuously greater than the reference wavelength. Also, in the case where the peak wavelength shifts to the long wavelength side with respect to the optical output signal S74, the wavelength of the optical output signal S74 becomes continuously less than the reference wavelength. Also, in the case where the peak wavelength matches the wavelength of the optical output signal S74, the wavelength of the optical of the signal S74 becomes continuously equal to the reference wavelength.

Furthermore, the divergence between the peak wavelength and the wavelength of the optical output signal S74 increases in proportion to the difference of the wavelength of the optical output signal S74 from the reference wavelength. In this way, there is a one-to-one relationship between the wavelength of the optical output signal S74 and the difference between the wavelength of the optical output signal S74 and the reference wavelength. Consequently, the value of the voltage of the first direct current signal S92 is determined in advance unambiguously with respect to the wavelength of the optical output signal S74.

Moreover, as discussed above, the varying component caused by the variations in wavelength of the optical input signal S72 is not included in the alternating current component extracted by the lock-in amplifier 91 from the electric feedback monitoring signal S86. Accordingly, as discussed below, the lock-in amplifier 91 can convert the electric feedback monitoring signal S86, which was input, to a first direct current signal S92 for eliminating the divergence between the wavelength peak and wavelength of the optical output signal S74. Consequently, as discussed below, the optical wavelength filter control portion 85 can control this dielectric multilayer filter 101 because of being able to output the control signal S88 for applying the maximum transmission peak to the optical output signal S74 to the optical wavelength filtering portion 71.

When the varying component caused by variations in the intensity of the optical input signal S72 is temporarily included in this alternating current component and the frequency of these variations in the intensity matches the detection frequency, the lock-in amplifier 91 also extracts the alternating current component with the detection frequency caused by these variations in intensity. This alternating current component becomes noise with the conversion of the electric feedback monitoring signal S86 which was input by the lock-in amplifier 91 to the abovementioned first direct current signal S92.

The lock-in amplifier 91 then outputs this first direct current signal S92 to the amplitude amplifier 93.

By amplifying the amplitude of the first direct current signal S92, this amplitude amplifier 93 outputs the second direct current signal S94 for moving the dielectric multilayer filter 101 from the standard position to the position for selecting the specific wavelength.

Next, the second adder 97 adds this second direct current signal S94 and the reference bias signal S96, for moving the dielectric multilayer filter 101 to the standard position for selecting the reference wavelength and output from the reference bias signal generator 95, and outputs the result as the direct current movement signal S98 to the first adder 99.

Consequently, by repeating the abovementioned feedback process, this third variable optical wavelength filter can control the rotation of this dielectric multilayer filter 101 when the optical input signal S72 is present, of course, and in the same way during a momentary loss of the optical input signal S72.

The present invention is not limited to only the abovementioned embodiment and can include various changes depending on the design.

For example, in the abovementioned embodiment, the actuator 105 causes the rotation of the dielectric multilayer filter 101 with the axis of rotation being the center line of the dielectric multilayer filter 101 and changes the specific wavelength, but may also move the dielectric multilayer filter 101 within a plane perpendicular to the direction at which the optical input signal S72 (S100) is incident to the dielectric multilayer filter 101 and change the specific wavelength. FIG. 16 is a drawing for explaining the movement of the optical wavelength filter 101. The specific wavelength of this optical wavelength filter 101 changes according to the position of the surface.

As clear from this explanation, the variable optical wavelength filter according to the present invention can control the movement of an optical wavelength filter when the optical input signal is present, of course, and in the same way during a momentary loss of the optical input signal.

Or, the variable optical wavelength filter according to the present invention can control the movement of an optical wavelength filter even when the intensity of the optical input signal varies and the frequency of that variation in intensity becomes the detection frequency.

What is claimed is:

1. A variable optical wavelength filter comprising:
   an optical wavelength filtering portion having an optical wavelength filter for selecting the specific wavelength for providing the maximum transmission peak to an optical output signal from the wavelengths of an optical input signal; and an optical wavelength filter control system for outputting to said optical wavelength filtering portion a control signal comprising: a direct current movement signal for moving said optical wavelength filter to a position for selecting said optical output signal with said specific wavelength according to wavelength variation of said optical input signal; and an alternating current detection signal for providing an amplitude frequency to said optical output signal by slightly vibrating said optical wavelength filter at a fixed detection frequency;

wherein said optical wavelength filter control system comprises:

an optical wavelength filter control portion including a direct current component forming portion for sustaining the output of said direct current movement signal even during a momentary loss of said optical input signal, while determining the size of said direct current movement signal on the basis of the amplitude of said optical output signal; and an alternating current detection signal generator for outputting said alternating current detection signal at said detection frequency.

2. The variable optical wavelength filter according to claim 1, wherein said optical wavelength filter control system comprises:
   a beam splitting portion for splitting said optical output signal into an optical monitoring signal and optical main signal; and
   a photoelectric converting portion for converting said optical monitoring signal to an electronic feedback monitoring signal and outputting this signal to said optical wavelength filter control portion.

3. The variable optical wavelength filter according to claim 1, wherein said optical wavelength filter control system comprises:
   a first beam splitting portion for splitting said optical input signal into a first optical monitoring signal and said optical input signal;
   a second beam splitting portion for splitting said optical output signal into a second optical monitoring signal and optical main signal;
   first and second photoelectric converting portions for respectively converting said first and second optical monitoring signals into first and second electric monitoring signals; and
   a divider for dividing a signal value of said second electric monitoring signal by a signal value of said first electric monitoring signal and outputting the result as an electric feedback monitoring signal to said optical wavelength filter control portion.

4. The variable optical wavelength filter according to claim 1, wherein said optical wavelength filter is a dielectric multilayer filter.

5. The variable optical wavelength filter according to claim 1, wherein said optical wavelength filtering portion comprises an actuator for converting said control signal to power and having a shaft for moving said optical wavelength filter based on said power.

6. The variable optical wavelength filter according to claim 2, wherein said direct current component forming portion comprises:
   a lock-in amplifier for extracting the component of said amplitude frequency from said electric feedback monitoring signal, smoothing the component of said amplitude frequency, and converting same to a first direct current signal;

an amplitude amplifier for amplifying the amplitude of said first direct current signal and converting same to a second direct current signal; and an integrator for integrating said second direct current signal and outputting the result as said direct current movement signal to said optical wavelength filtering portion.

7. The variable optical wavelength filter according to claim 3, wherein said direct current component forming portion comprises:

a lock-in amplifier for extracting the component of said amplitude frequency from said electric feedback monitoring signal, smoothing the component of said amplitude frequency, and converting same to a first direct current signal;

an amplitude amplifier for amplifying the amplitude of said first direct current signal and converting same to a second direct current signal; and an integrator for integrating said second direct current signal and outputting the result as said direct current movement signal to said optical wavelength filtering portion.

8. The variable optical wavelength filter according to claim 5, wherein said actuator changes said specific wavelength by rotating said optical wavelength filter about the center line of the optical wavelength filter that is orthogonal to the crossover line between the incident plane at which said optical input signal is incident to said optical wavelength filter and the filter surface of said optical wavelength filter.

9. The variable optical wavelength filter according to claim 5, wherein said actuator changes said specific wavelength by moving said optical wavelength filter within a plane perpendicular to the direction along which said optical input signal is incident to the said optical wavelength filter.

10. A variable optical wavelength filter comprising:

an optical wavelength filtering portion having an optical wavelength filter for selecting the wavelength of an optical output signal including a specific wavelength;

wherein, in the case where the selected wavelength of said optical output signal matches a predetermined reference wavelength, said optical wavelength filter selects, as said specific wavelength, the wavelength for providing the maximum transmission peak to said optical output signal from the wavelengths of an optical input signal, or in the case where there is a difference between the wavelength of said optical output signal and said reference wavelength, selects, as said specific wavelength, the wavelength for providing a transmittance corresponding to said difference and slightly less than said maximum transmission peak to said optical output signal from the wavelengths of an optical input signal; and the variable optical wavelength filter further comprising:

an optical wavelength filter control system for outputting to said optical wavelength filtering portion a control signal comprising: a direct current movement signal for moving said optical wavelength filter to a position for selecting said specific wavelength according to the wavelength variation of said optical input signal; and an alternating current detection signal for providing the amplitude frequency to said optical output signal by slightly vibrating said optical wavelength filter at a fixed detection frequency;

wherein said optical wavelength filter control system comprises:

an optical wavelength filter control portion including a direct current component forming portion for determining the size of said direct current movement signal on the basis of an amplitude of said optical output signal, and an alternating current detection signal generator for outputting said alternating current detection signal at said detection frequency;

a first beam splitting portion for splitting said optical input signal into a first optical monitoring signal and said optical input signal;

a second beam splitting portion for splitting said optical output signal into a second optical monitoring signal and optical main signal;

first and second photoelectric converting portions for respectively converting said first and second optical monitoring signals into first and second electric monitoring signals; and a divider for dividing said second electric monitoring signal by said first electric monitoring signal and outputting the result as an electric feedback monitoring signal to said optical wavelength filter control portion.

11. The variable optical wavelength filter according to claim 9, wherein said direct current component forming portion comprises:

a reference bias component generator for outputting a reference bias signal for moving said optical wavelength filter to the standard position for selecting said reference wavelength;

a lock-in amplifier for extracting said amplitude frequency component from said electric feedback monitoring signal and smoothing and converting this amplitude frequency component to a first direct current signal;

an amplitude amplifier for amplifying the amplitude of said first direct current signal and converting the amplified signal to a second direct current signal for moving said optical wavelength filter from said standard position to a position for selecting said specific wavelength; and an adder for adding said second direct current signal and said reference bias signal and outputting the result as said direct current movement signal to said optical wavelength filtering portion.

12. The variable optical wavelength filter according to claim 10, wherein said optical wavelength filter is a dielectric multilayer filter.

13. The variable optical wavelength filter according to claim 10, wherein said optical wavelength filtering portion comprises an actuator for converting said control signal to power and having a shaft for moving said optical wavelength filter based on said power.

14. The variable optical wavelength filter according to claim 13, wherein said actuator changes said specific wavelength by rotating said optical wavelength filter about the center line thereof, that is orthogonal to the crossover line between the incident plane at which said optical input signal is incident to said optical wavelength filter and the filter surface of said optical wavelength filter.

15. The variable optical wavelength filter according to claim 13, wherein said actuator changes said specific wavelength by moving said optical wavelength filter within a plane perpendicular to the direction at which said optical input signal is incident to the said optical wavelength filter.

* * * * *